US009386026B2

(12) United States Patent
Blot-Lefevre

(10) Patent No.: US 9,386,026 B2
(45) Date of Patent: Jul. 5, 2016

(54) SYSTEM AND METHOD FOR SCHEDULING AND EXECUTING SECURE ELECTRONIC CORRESPONDENCE OPERATIONS

(75) Inventor: Eric Blot-Lefevre, Neuilly-sur-Seine (FR)

(73) Assignee: TRUSTSEED SAS, Galluis (FR)

( * ) Notice: Subject to any disclaimer, the term of this patent is extended or adjusted under 35 U.S.C. 154(b) by 0 days.

(21) Appl. No.: 13/499,108

(22) PCT Filed: Sep. 21, 2010

(86) PCT No.: PCT/EP2010/063875
§ 371 (c)(1),
(2), (4) Date: Mar. 29, 2012

(87) PCT Pub. No.: WO2011/039077
PCT Pub. Date: Apr. 7, 2011

(65) Prior Publication Data
US 2012/0191976 A1    Jul. 26, 2012

(30) Foreign Application Priority Data

Sep. 30, 2009 (FR) .................................. 09 56823

(51) Int. Cl.
*H04L 29/06* (2006.01)
*H04L 9/32* (2006.01)

(52) U.S. Cl.
CPC .............. *H04L 63/12* (2013.01); *H04L 9/3213* (2013.01); *H04L 9/3263* (2013.01); *H04L 9/3297* (2013.01); *H04L 63/0823* (2013.01); *H04L 2209/56* (2013.01); *H04L 2463/121* (2013.01)

(58) Field of Classification Search
None
See application file for complete search history.

(56) References Cited

U.S. PATENT DOCUMENTS 8,151,363 B2 *  4/2012  Smithson .................... 726/30
8,229,807 B2 *  7/2012  ElBizri ....................... 705/30
(Continued)

FOREIGN PATENT DOCUMENTS

FR          2900012 A1    10/2007
FR          2926175 A1     7/2009
(Continued)

OTHER PUBLICATIONS

Sageder S. et al.: "Case Study: Using Digital Signatures for the Archival of Medical Records in Hospitals," Risks and Security of Internet and Systems, 2008. Crisis '08. Third International Conference on, IEEE, Piscataway, NJ, USA, Oct. 28, 2008, pp. 213-220.
(Continued)

*Primary Examiner* — Kaveh Abrishamkar
(74) *Attorney, Agent, or Firm* — Baker & Hostetler LLP

(57) ABSTRACT

A secure electronic correspondence method and system based on a principle relating to the uniqueness of the originals of the correspondences. The archiving thereof is certified by a certification service provider and performed by an archive operator in an electronic safe box. The main steps of the processes for processing said correspondences are the subject of a report confirming the correct execution thereof, including the return of a certification token by the operator responsible for the step to the managers of the trust chain. In a variant, correspondences belonging to a document management series can only be sent if they meet management rules set for the series. In a privileged mode, functions of the electronic correspondence operators that do not necessarily have to meet user proximity requirements can be grouped together into shared service centers within which the communications are reduced without negatively affecting the reliability of the process.

19 Claims, 11 Drawing Sheets

(56) References Cited

U.S. PATENT DOCUMENTS

| | | | |
|---|---|---|---|
| 2002/0107928 A1* | 8/2002 | Chalon | 709/206 |
| 2006/0143462 A1* | 6/2006 | Jacobs | 713/181 |
| 2008/0079979 A1* | 4/2008 | Holt et al. | 358/1.14 |
| 2010/0043070 A1* | 2/2010 | Okada et al. | 726/21 |

FOREIGN PATENT DOCUMENTS

| | | | |
|---|---|---|---|
| FR | 2930392 A1 | 10/2009 | |
| WO | 0025245 A1 | 5/2000 | |
| WO | WO 00/25245 * | 5/2000 | G06F 17/60 |

OTHER PUBLICATIONS

Simon Garfinkel & Eugene H. Safford: "Web Security & Commerce," Jun. 1997.

Meadors K.: "Secure Electronic Data Interchange over the Internet," IEEE Internet Computing, IEEE Service Center, New York, NY, US, vol. 9, No. 3, May 1, 2005, pp. 82-89.

* cited by examiner

| Order number Tokens | Name and use of the tokens | Event and Return of the Token to the PSC-COR |
|---|---|---|
| J1 | Sender ID Submission S°S1 EXP PSD/PSC-COR | Strong Authentication Loop |
| J2 | EXP PSD Preparation | Display of Specimen in private office |
| J3 | EXP OPE Composition | 2 specimens of correspondence document |
| J4 | Sender ID Validation S°S2 EXP PSD/PSC-COR | Strong Authentication Loop |
| J5 | EXP PSD Validation | Dispatch report, Sig check / PSC-COR  J20 ● |
| J6 | EXP OPE Copy authentication | Sealing 2$^{nd}$ specimen, return with J3 to PSD*  J21 ● ● ● |
| J7 | EXP OPE executing archiving of original | Deposit voucher  J22 ● ● ● |
| J8 | EXP OPE executing archiving of original | Deposit voucher  J23 ● ● ● |
| J9 | EXP OPE executing switching of duplicates | Bilaterality voucher Passing account |
| J10 | EXP OPE executing switching of duplicates | Bilaterality voucher Passing account |
| J11 | EXP OPE executing transfer of Structured File | Signed acknowledgement from the addressee server J24 ● |
| J12 | EXP OPE executing composition of AR Coupon | Acknowledgement from DES operator. AR Specimen |
| J13 | Addressee ID Validation S°S3 DES PSD | Strong Authentication Loop |
| J14 | DES PSD Validation | Dispatch report, Sig check / PSC-COR  J25 ● |
| J15 | DES OPE Copy authentication | Sealing 2$^{nd}$ specimen, return with J12 to PSD*  J26 ● ● ● |
| J16 | DES OPE executing archiving | Deposit voucher  J27 ● ● ● |
| J17 | DES OPE executing archiving | Deposit voucher  J28 ● ● ● |
| J18 | DES OPE executing switching | Bilaterality voucher Passing account |
| J19 | DES OPE executing switching | Bilaterality voucher Passing account |
| 19 TOKENS | 12 J per PSD EXP & 7J per PDS DEST (19) | 5 checks for SE PSD1/PSC and 4 for PSD2/PSC-COR (9) |
| TOKEN J20 | PSD return to PSC-COR (MVP) of the Table of Correspondence Tokens for the N° of Sender / Addressee MAILING | Delivery to counterpart by PSC-COR / MVP of the Probative Value Certificate (CVP) with its scoring 20/20 to PSD |

FIG.5

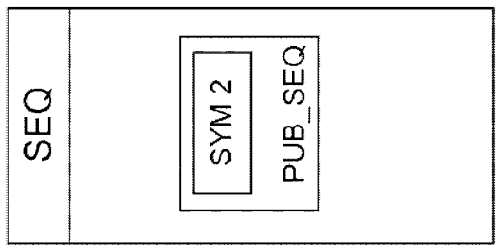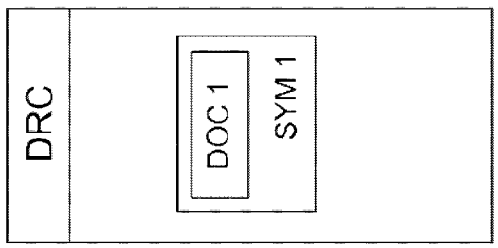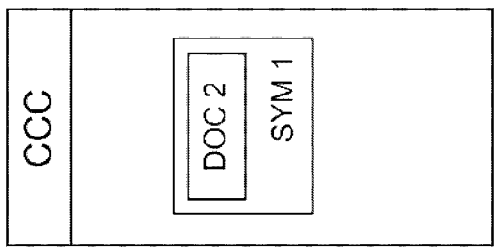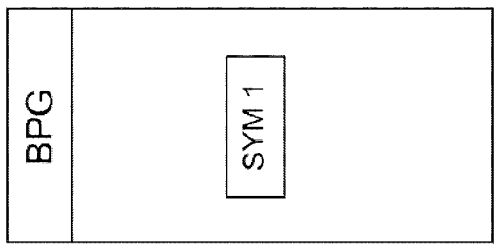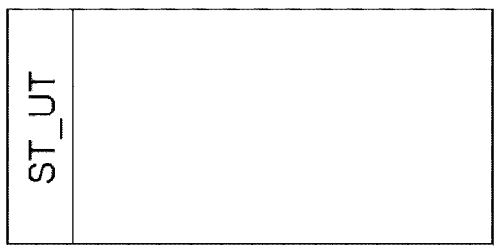
FIG.9

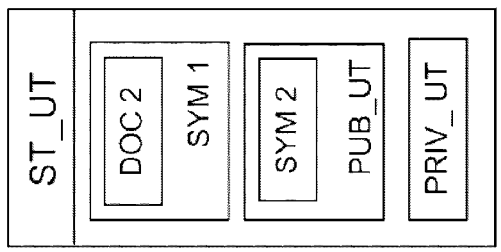
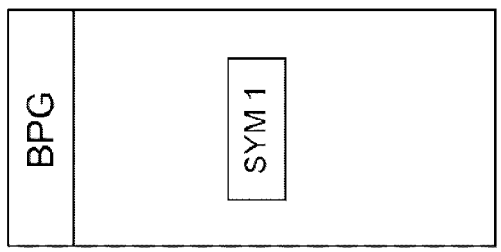
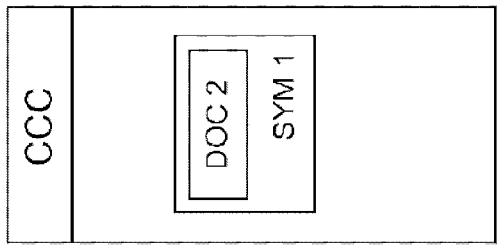
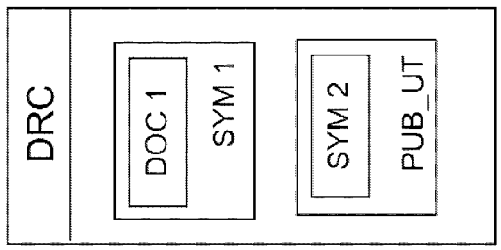
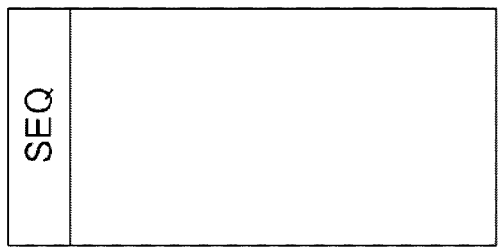
FIG.10

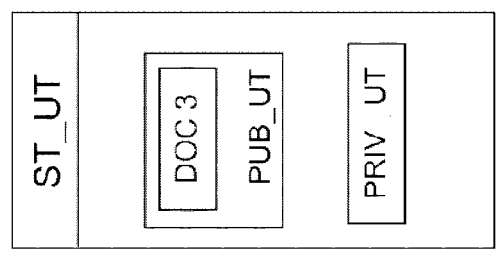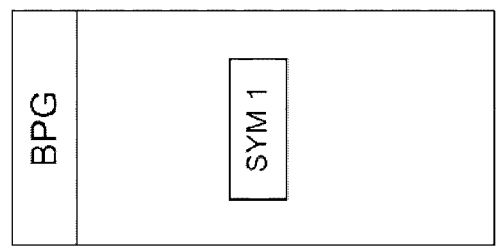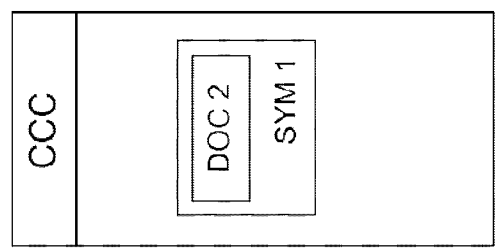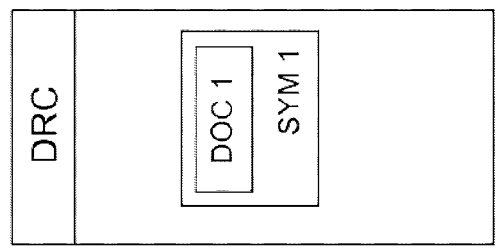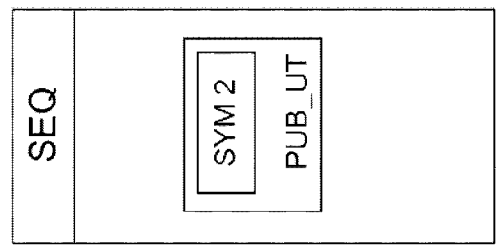
FIG.11

SYSTEM AND METHOD FOR SCHEDULING AND EXECUTING SECURE ELECTRONIC CORRESPONDENCE OPERATIONS

CROSS-REFERENCE TO RELATED APPLICATIONS

This application is a National Stage of International patent application PCT/EP2010/063875, filed on Sep. 21, 2010, which claims priority to foreign French patent application No. FR 09 56823, filed on Sep. 30, 2009, the disclosures of each of which are incorporated by reference in their entireties.

FIELD OF THE DISCLOSED SUBJECT MATTER

The present invention belongs to the field of secure electronic correspondence systems. More precisely, it is applicable to scheduling and execution processes for the operations of such systems in an architecture allowing the probative value of such correspondences to be guaranteed.

BACKGROUND

European legal systems now recognize that an electronic document whose author is identifiable in a secure manner and which is kept under conditions that allow its integrity to be guaranteed has the same probative value as a written hardcopy document (Article 1316 and following of the French Civil Code, for example). However, the most widely-used systems for production, such as a word processor generating a document in the PDF (Portable Digital File) format, and for exchange (electronic messaging over the Internet) of electronic documents do not currently allow either the identity of their author or their integrity to be guaranteed. The problem relates to both private correspondences between individuals or between an individual and a business or an institution and the correspondences between businesses and administrations or between a business or an administration and its customers or its users. In the latter case, the flow of documents can be particularly high (several tens of millions of invoices per month are addressed to the customers of EDF, of GDF Suez, of Orange). The fabrication and the dispatching of these documents are therefore automated in production chains which necessarily involve many operators. If it is desired to guarantee that the document sent and archived is identical to that originally produced, it is therefore necessary to provide a traceability from end to end of all these operations and a verification that the operators have carried out the operations that they needed to execute. This applies to a production chain for both paper documents and electronic documents. Furthermore, in the case of an electronic transmission, in order for the documents thus sent to be considered as being validly addressed, these documents need to carry the identification of the sender and the latter needs to be assured of the identity of the addressees.

Partial solutions have been applied to the problem of the probative value of electronic documents exchanged via electronic channels. In particular, if the sender disposes of an electronic signature certificate delivered under prescribed conditions and whose validity is verified by a certification authority, his identity as author of an electronic document on which he will have displayed said certificate will be recognized as validly demonstrated. However, electronic signature certificates are still not very common by reason notably of their high cost and of their inconvenience of use.

The Applicant has therefore already filed patent applications in France notably with the aim of providing a rating on the identity of a sender and of addressees of electronic documents allowing the probative value of the documents exchanged between these parties to be judged. See for example the Applications filed under the numbers FR/06 04 107 and FR/08 02 239. In addition, the Applicant is filing, on the same day as the present application, a patent application whose object is to mainly deal with the problem of the certification of all the attributes of the users of the secure electronic correspondence system by a mechanism of sessions and the certification of the correspondences exchanged by a mechanism of certification tokens.

In order to further improve the reliability of the scheduling and execution processes for the secure electronic correspondences within a context of industrial production processing hundreds of thousands or even millions of documents per day, it has however turned out to be necessary to be able to guarantee the quality and the conservation of documents referred to as 'originals' thanks to a process of copy authentication of versions traced by certification tokens.

SUMMARY

For this purpose, the present invention discloses a system for secure electronic correspondence between at least one sender user and at least one addressee user, said system comprising at least one domiciliation server for electronic correspondences, at least one composition server for said correspondences and at least one server for certification of electronic correspondences, said composition server generating, for each correspondence operation with probative value, at least two specimens together with two originals certified as having probative value by said certification server, the said system being characterized in that one of the specimens is processed to be sent to the addressee of the correspondence operation after said operation has been validated by the sender user based on display of the other specimen made available to him on a domiciliation server.

Advantageously, the proof of validation of said operation carried out by the sender user is date stamped and linked to the specimen having served as a basis for the validation and for the proof of the authentication of the sender user by the domiciliation server within a legal signature structured file.

Advantageously, a copy of said legal signature structured file is sealed by the domiciliation server and archived by an archiving server.

Advantageously, the legal signature structured file, a proof of its sealing and a proof of its archiving are recorded and deposited by the domiciliation server on the server of an escrow third party.

Advantageously, one of the originals is archived by an archiving server in an electronic safe of a user.

Advantageously, between the generation of said original document and its archiving, two copies of a symmetrical encryption key, SYM1 and SYM2, are generated by the domiciliation server, said original document being encrypted with the copy of symmetrical key SYM1, said copy SYM1 being conserved in the management private office of the user, the copy of symmetrical key SYM2 being transmitted to an escrow third party SEQ after encryption of said copy SYM2 by a public key of said escrow third party.

Advantageously, between the generation of said original document and its archiving, two copies of a symmetrical encryption key, SYM1 and SYM2, are generated by the domiciliation server, said original document being encrypted with the copy of symmetrical key SYM1, said copy SYM1 being conserved in the management private office of the user, the copy of symmetrical key SYM2 being transmitted to said user after encryption of said copy SYM2 by a public key of said user.

Advantageously, a copy of said copy SYM2, encrypted by a public key of the user, is transmitted to the archiving operator in order to be conserved with the original document in the electronic safe of the user.

Advantageously, the composition server furthermore generates at least two duplicates, one of which is intended to be transferred into the correspondence account of the sender user into a correspondence book located by a switching server and the other duplicate is intended to be transferred into the correspondence account of an addressee user into a correspondence book by a switching server.

Advantageously, at least one of the duplicates is encrypted with the key copy SYM1 prior to transfer into a correspondence book.

Advantageously, at least a third duplicate is generated, said third duplicate being encrypted with a public key of the sender/addressee user prior to transferring to a local workstation of said sender/addressee user.

Advantageously, said composition server furthermore generates a data file to a transmission server.

Advantageously, said composition server furthermore generates a management structured file intended to be transmitted to an application management server of an addressee user.

Advantageously, said transmission to the application management server of at least one addressee user is carried out using a protocol of the AS2 type.

Advantageously, said composition server furthermore generates a printing file intended to be transmitted to at least one electronic publishing server.

Advantageously, said composition server furthermore generates at least one management coupon intended to become a new electronic correspondence whose content is at least partially determined by management rules for a series of electronic correspondences to which said coupon is attached.

Advantageously, the composition of said new electronic correspondence produced from said management coupon by a composition server attached to the certification server having certified the copy authentication of said management coupon is only possible if said new electronic correspondence conforms to said management rules.

Advantageously, for each electronic correspondence operation whose probative value must be evaluated, at least one of the composition, switching, transmission, archiving and electronic publishing servers receives from the domiciliation server a number of certification tokens determined by the type of said operation, said tokens being transmitted to it by the certification server.

Advantageously, the certification server only delivers a probative value certificate to the sender user if and when it has received from the domiciliation server, before the expiration of a settable time period, the totality of the tokens that it has transmitted, said return being proof of the correct execution by said servers of the operations specified by the certification server for the type of the correspondence operation that is the object of the probative value certificate.

Advantageously, the servers carrying out composition, switching and transmission functions belong to a first group of servers connected together via a local-area communications network and exchange data between them using a protocol of the Pass File type.

Advantageously, the servers carrying out archiving and electronic publishing functions limited to a territory belong to a second group of servers connected to the local-area network of the servers of the first group via a wide-area communications network and exchange data with said network using a protocol of the Switch Out type.

The present invention also discloses a method for secure electronic correspondence between at least one sender user and at least one addressee user, said method comprising at least one step for connection to a domiciliation server for electronic correspondences, at least one step for composition of said correspondences, and at least one step for connection of the domiciliation server to a certification server for electronic correspondences, said composition step generating, for each correspondence operation with probative value, at least two specimens together with two originals certified as having probative value by said certification server, wherein one of the specimens is processed in order to be sent to the addressee of the correspondence operation after said operation has been validated by the sender user based on the display of the other specimen made available to him on said domiciliation server.

The invention also offers the advantage of allowing the verification, for each operator involved in the process of execution of a secure electronic correspondence operation, that a correspondence sent has been received after a chosen interval of time. Also, thanks to the use of management coupons attached to a document belonging to a document management series, it is possible to satisfy the matching and backing criteria prescribed by the auditors who have to certify paperless transactions. Furthermore, in one preferred embodiment where the operations are grouped in a shared services centre, the communications can be executed over a local-area network without high-security protocol as is the case for the operations transiting over a network between remote services centres. Their cost of communications is greatly reduced.

In several embodiments, the invention also allows an archiving to be carried out whose confidentiality is preserved by encryption of the documents which allow the user, under certain conditions, to have a local access himself to the original documents while at the same time preserving both the original nature of the documents and the possibility of access to said documents for the legal authorities.

BRIEF DESCRIPTION OF THE DRAWINGS

The invention will be better understood and its various features and advantages will become apparent from the description that follows of several exemplary embodiments and from its appended figures, in which:

FIG. 5 defines the certification tokens used by the processing steps for implementing the processes for execution of secure electronic correspondence operations in one embodiment of the invention;

FIG. 9 shows the functional flow diagram of a method for encryption of a document to be archived with escrow of the encryption key;

FIG. 10 shows the functional flow diagram of a method for encryption of a document to be archived without escrow of the encryption key;

FIG. 11 shows the functional flow diagram of a method for encryption of a document to be archived with escrow of the encryption key which preserves a local access for the user to the archived document.

DETAILED DESCRIPTION

In the figures and in the description, the numerals denote indifferently, except where an indication to the contrary is given, service providers or operators or else servers that they use to carry out the operations useful or necessary for the implementation of the invention.

In the description, the figures and the claims, the acronyms and abbreviations that appear in the table hereinbelow have the meanings indicated, unless a different meaning is stated later on in the description.

| Acronym | Meaning |
|---|---|
| ACK | Acknowledgement |
| ANN | Directory server |
| AR | Acknowledgement of receipt |
| ARC | Archiving |
| BPG | Management private office |
| CCB | Bilateral correspondence agreement |
| CCC | Consolidated correspondence account |
| CCU | Universal correspondence agreement |
| CMT | Switching |
| COL | Legal scheduling chamber |
| CSS | Secure secret code |
| DES | Addressee |
| DOC | Document |
| DUP | Duplicate |
| EDI | Electronic publishing |
| ERP | Enterprise Resource Planning (or enterprise resource management software) |
| EXP | Sender |
| FDS | Structured data file |
| FGS | Structured management file |
| FIO | Order file |
| FPT | Station file |
| H1 | Handover certification |
| H2 | Transmission validation certification |
| H3 | Reception validation certification |
| H4 | Consultation certification |
| H5 | Archiving handover certification |
| H6 | Archiving validation certification |
| J | Token |
| LRAR FS | Registered letter with acknowledgement of receipt in a structured file |
| MCIS | Inter-services connectivity matrix |
| MVPD | Document probative value matrix |
| OPEM | Shared operator |
| OPEN | National operator |
| OPET | Processing operator |
| OPET-ARC | Archiving operator |
| OPET-CMT | Switching operator |
| OPET-COMP | Composition operator |
| OPET-EDI | Third-party electronic publishing operator |
| OPET-TRANS | Transmission operator |
| OPT | Correspondence table for a legal operator |
| ORI | Original |
| PF | Pass File (local inter-service provider file transfer) |

-continued

| Acronym | Meaning |
|---|---|
| PP | Payment proposal |
| PRN | Printing file |
| PSC-COR | Provider of certification services |
| PSCE/HD | Date-stamping service provider |
| PSCE/SE | Electronic signature service provider |
| PSD | Provider of domiciliation address services |
| PVE | Dispatch report |
| PVR | Receipt report |
| SPE | Document or acknowledgement specimen |
| SSC | Shared Services Centre |
| SWO | Switch Out (remote inter-service provider transfer) |
| UTIL | Electronic correspondence service user |
| VERS | Document versions |

Figure 1:
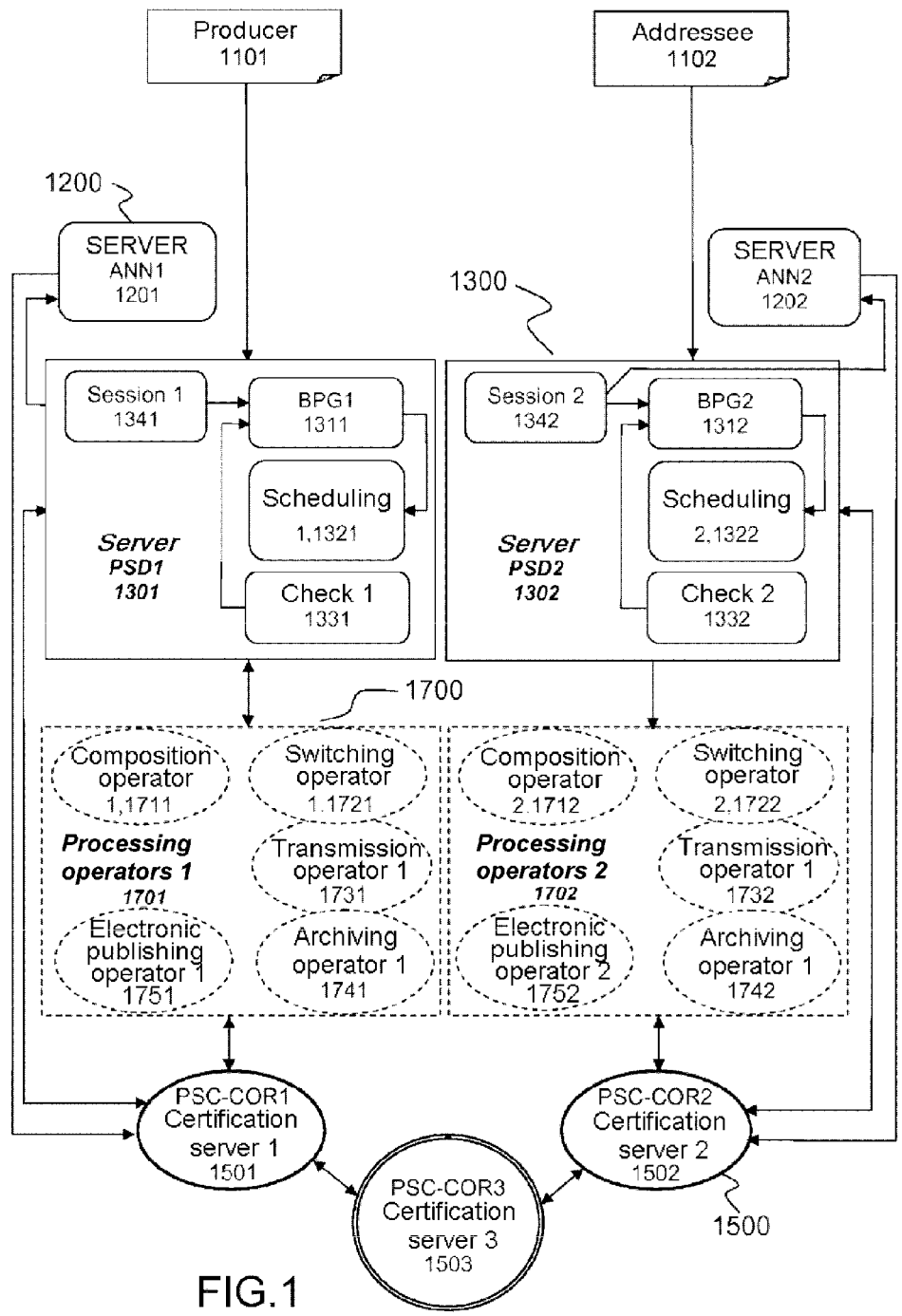
FIG. 1 shows the simplified architecture of a secure electronic correspondence system in one embodiment of the invention.

FIG. 1 shows the simplified architecture of a secure electronic correspondence system in one embodiment of the invention.

The dematerialization of the exchanges of documents or correspondences meets an objective for gain in productivity. In particular, the potential gain resulting from a dematerialization of invoicing in France has been estimated at 2% of GDP, or more than 40 billion Euros. However, the specifications to be met for this dematerialization to comply with the legal and regulatory stipulations imposes the verification of the identity of the sender of the document and of the integrity of said document. However, the dematerialization of the production of millions of documents assumes the installation of veritable industrial production lines in order to produce said documents.

As illustrated in the lower part of FIG. 1, new jobs as processing operators (OPET) for the electronic documents or correspondences 1700 have therefore been created, the main ones being composition operators, transmission operators, archiving operators, and bilateral switching operators. The composition operators assemble the documents based on page templates and data files. The transmission operators carry out the routing, postal or electronic, of the documents. The archiving operators conserve the documents for the account of the senders or the addressees, in the form of the original or of a copy. The document switching operators record as a double-entry account the movements over the correspondence accounts of each user and operator so as to be able to verify that, after a settable time, all correspondence sent has its counterpart in reception. In the majority of cases, the existence of the counterpart will need to be verified at the latest within the same day, otherwise the correspondence sent will be rejected by the system.

It may of course be envisaged that all or part of these processing operations are carried out by the same operator, for example in a shared services centre as will be seen later on in the description. However, in electronic correspondence systems having the role of covering extensive geographical regions and different legal systems, it is probable that at least two functions must be executed locally: the archiving function, for legal or political reasons, and the part of the transmission relating to the multi-channel communication that involves sending a fax, printing, insertion into an envelope and postal routing, which are costly if they are carried out over a long distance.

However, for the probative value of an electronic document to be equivalent to that of a document written on a paper medium, it is necessary to be able to guarantee, over the whole lifetime of the document, the identity of the author and the integrity of his document. This guarantee can only be established if the chain for production and exchange of documents is a chain of trust.

In FIG. 1 a simplified architecture is shown capable of establishing this chain of trust. This architecture comprises four types of organizational entities, each entity managing data processing servers, databases and software specific to each type, said entities being linked together via one or more communications networks which may be the public network or private networks over which standard or specialized communications protocols can be implemented:

- A first type of entity is formed by groups of sender 1101 and addressee 1102 users "UTIL" of correspondences, each group of users being united by a cause meaning that some of their identification data are available on the same directory server or ANN 1200, 1201, 1202;
- A second type of entity is formed by "Providers of domiciliation address services for correspondence", PSD, 1300, 1301, 1302;
- A third type of entity is formed by the "Processing operators" (OPET) for electronic correspondences, 1700, 1701, 1702;
- A fourth type of entity is formed by "Providers of certification services for correspondence" (PSC-COR), 1500, 1501, 1502.

The entities of the first type will first of all be described. In order to facilitate understanding, the architecture is presented with two users, a sender user 1101 and an addressee user 1102 belonging to two different directories ANN, 1201 and 1202. The architecture is therefore duplicated in FIG. 1. The system of the invention is configured for managing the electronic correspondences between these users, as made clear later in the description.

Groups of users grouped together under the same Directory may be formed for various reasons:

- Such a group can be formed by all the employees of a company throughout the world (or by certain categories of these employees: managing directors; researchers in a given discipline; sales teams responsible for the marketing of a given product, etc.);
- People under the administration of one territory can naturally form such a group;
- A large company may wish to gather its suppliers around itself putting at their disposal an extranet giving them access to reserved information and furthermore directing them to supply their documents (proposals, invoices, user manuals, etc.) according to certain standards;
- A chain of general retail or specialized stores, a retail bank, generally offer their customers access to reserved space on their Internet site;
- An Internet access provider, who generally provides a standard messaging service.

In certain respects, these groups of users united by a common point form communities. It can be seen that this notion can have different meanings depending on the context: a community can encompass individuals and corporate bodies, themselves represented by individuals who must have the power to do this, in the situation where the documents produced commit the corporate body that this individual represents. It also results from the very nature of the communities that have just been described that the same individual and the same corporate body may belong to several different communities. A community defines management rules for registering its members who can become users of the services of the community and, potentially, for said members to be able to invite persons external to their community to join them. The registration procedure necessarily involves non-electronic exchanges. In summary, the identification, addressing and authentication attributes of the future user are verified. A registered user therefore has a verified identity, validated postal and electronic addresses and at least one means of authentication, these various attributes being described in detail in the following part of the description. These data are stored in a database which forms, in its entirety or in part, a Directory ANN, 1200, 1201, 1202. In order to protect the registered data, it may be necessary to manage a certain amount of data of the database (notably the information relating to the modes of authentication) in a storage space logically or even physically separate from the Directory which must be accessible over the network of the community.

These entities of the first type are not specific to the field of electronic correspondence. Their primary objective is different (economic, social, etc.), the correspondence service being ancillary with respect to this primary objective.

In contrast, the main objective of the providers of domiciliation address services for correspondence PSD, 1300 is to provide this service to their customers or users. These service providers PSD make a management private office (BPG) 1310 available to their customers which forms an area specific to each user (or potentially to each entity, when the member of the community is a company). It is in this BPG that each sender user puts the correspondences that he wishes to send, according to the procedures that will be detailed later on in the description, and that the correspondences effectively sent and received are stored in a consolidated correspondence account (CCC). Said procedures depend on the type of correspondence. In one embodiment of the invention, 20 types of correspondences, known as universal, are defined, between which the sender user can choose. With each type of universal correspondence is associated a process for establishment of the probative value. It is in the BPG that the user designates the OPETs who will process his correspondences. It is also in the BPG that the sender user designates the addressees of his correspondences. The service providers PSD also carry out:

- a function 1320 for preparation and scheduling of the electronic correspondence operations, which consists in distributing the processing of the correspondence between the operators;
- a function 1330 for verification for the operations carried out, as will be seen in the present description.

In practice, entities of the first type may wish to deploy domiciliation address services for electronic correspondence for their customers. In this case, the entities of the 1$^{st}$ and of the 2$^{nd}$ type will form a single entity. This will also be the case if PSDs decide to offer a direct access to a directory specific to them which will be larger the more successful their service business.

The entities of the third type are formed by the OPETs. OPETs may be offered by the PSDs by default. The OPETs must be approved by said PSD and must conform to the prescribed procedures. A user who manages large flows of correspondence may however choose different OPETs by category of flows or by category of addressees. The composition, switching, transmission and archiving servers, which are shown in FIG. 1, may absolutely be in different geographic locations, as long as they are able to communicate between them according to the procedures prescribed by the manager of the system of the invention, detailed later on in the description. It will furthermore be seen that the question of knowing whether an OPET executes services provided within the borders of a single country (and hence potentially for a single PSC-COR, as explained later on) may be of importance. The pressure on the costs of the provision of services of this type is already driving towards a centralization of the operations in large shared services centres (or SSC) having the role of marketing their services within several countries. In this case, the same OPET will be subject to different certification policies by different PSC-CORs. In the following part of the description, the notion of shared processing operator (OPEM) will be introduced. The OPETs who are only subject to a single certification policy will be referred to as national processing operators (OPENs).

The entities of the fourth type are formed by the PSC-CORs who manage certification servers 1500. The PSC-CORs have the final responsibility for guaranteeing the probative value of the electronic correspondences which are exchanged within the system of the invention. Since this probative value is defined by national legislative and regulatory frameworks, it is advantageous to envisage that the responsibility of a PSC-COR be established within a national framework, or at least in compliance with that of each national legislation. For this reason, one or more PSC-COR(s) of a particular type must be envisaged, having the responsibility for ensuring the legal interoperability of the first level PSC-CORs. An architecture of this type is shown in FIG. 1. An architecture with more than two levels of PSC-CORs may however be envisaged while still remaining within the scope of the present invention.

It may also be envisaged for a PSC-COR to perform functions of a PSD. At the organizational level, this does not pose any particular problem since the two entities have a role for registration of the users (PSD), for scheduling of the operations of the OPETs (PSD) and for verification (PSC-COR) of said operations, and they cooperate in order to achieve the highest probative value. At the technical level, as a general rule, the architecture will preferably include two separate servers each carrying out part of the functions of the system.

Each PSC-COR must establish links with operators of a particular type which, in one embodiment of the invention, are of two types, encompassed within a general category of providers of electronic certification services (PSCE), which are not specific to secure electronic correspondence operations:

A first type of PSCE is formed by the electronic signature service providers (PSCE-SEs); the electronic signature generally makes use of cryptographic techniques which, in order to have probative value, require an authorization delivered by governmental authorities; a PSCE-SE manages a database of the encryption keys used for the electronic signature; it must be capable of keeping up to date with the keys having been repudiated or revoked (by their holder or by a competent authority, notably in the case of fraudulent or suspicious use) in order to be able to guarantee that a key used at a given time is valid; the certification server interrogates said database of the PSCE-SE either each time that an electronic signature is used in the system, or by random selection at frequencies achieving a compromise between the reliability of the system and the loading of the data processing system;

A second type of PSCE is formed by the date-stamping service providers (PSCE-HDs); date stamping allows a definite date, fixed to an atomic clock, to be assigned to the documents that are subject to this procedure; the PSCE-HDs must also have an approval; the certification server sends a date-stamping request to the PSCE-HD for a condensed version of the document to be date stamped, and the date-stamp certificate that it receives in return is sealed with the document.

It may also be perfectly well envisaged, within the framework of the system of the invention, for some of the functions indicated hereinabove to be carried out by a PSC-COR, as long as the PSC-COR has the necessary approvals. However, the chain of trust will have a higher probative value if the PSC-CORs and PSCEs of the two types are independent from one another.

Figure 3:
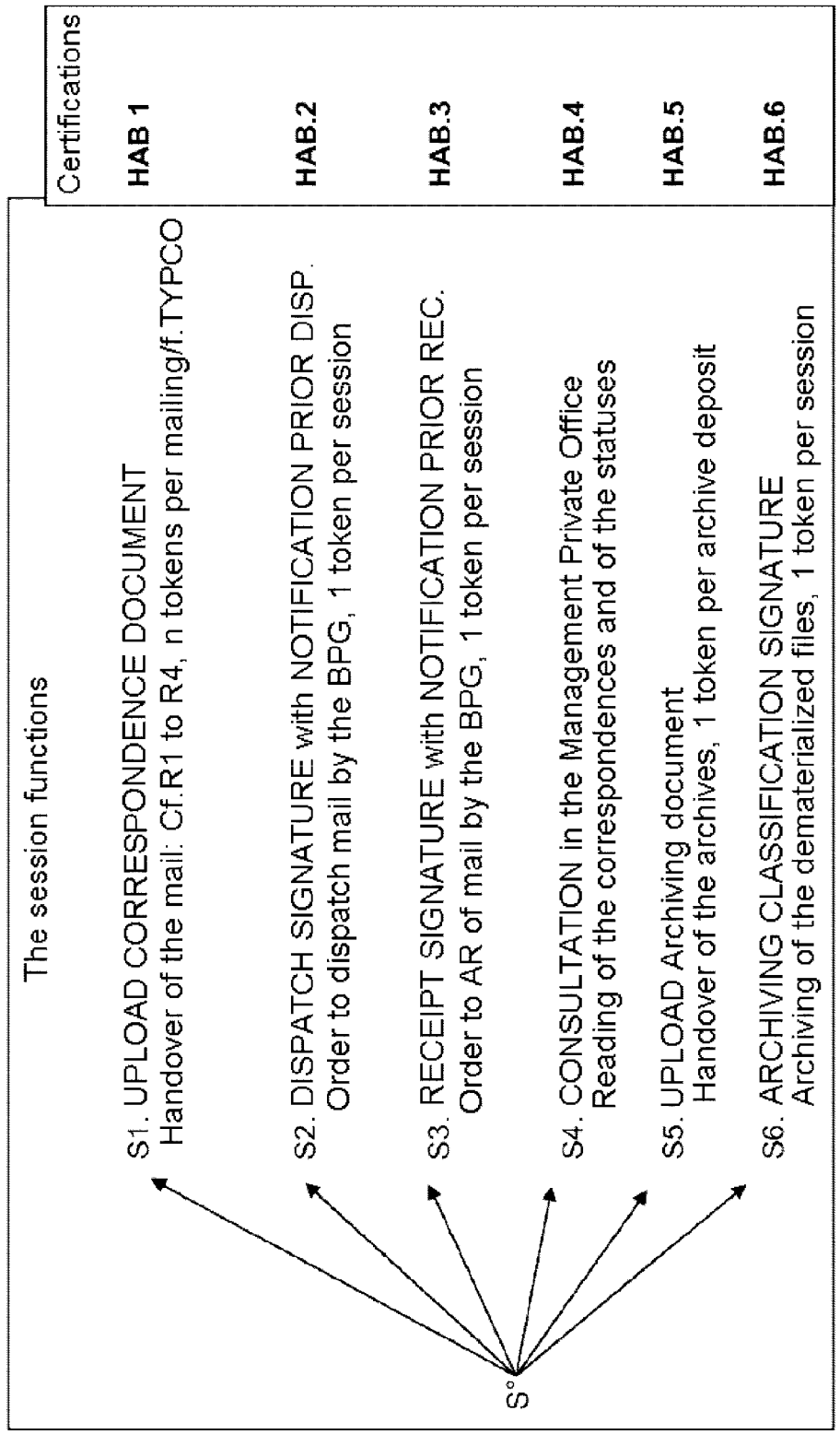
FIG. 3 shows the various types of session in which the processes for execution of secure electronic correspondence operations are implemented in one embodiment of the invention.

The access of the sender or addressee users to the system is effected via a session mechanism which comprises authentication procedures whose completeness depends on the type of operations to be performed, as will be detailed in the comments to FIG. 3. A session is initiated with a server of a PSD 1200 by a sender user 1101 who wishes to send electronic correspondences. It may also be initiated by an addressee user 1102 who wishes to be made aware of a correspondence for which he has received notification and to acknowledge receipt thereof. Several types of sessions can be defined. A session encompasses several processes allowing the electronic correspondence operations to be executed and their certification when their execution complies with the standard.

Figure 2:
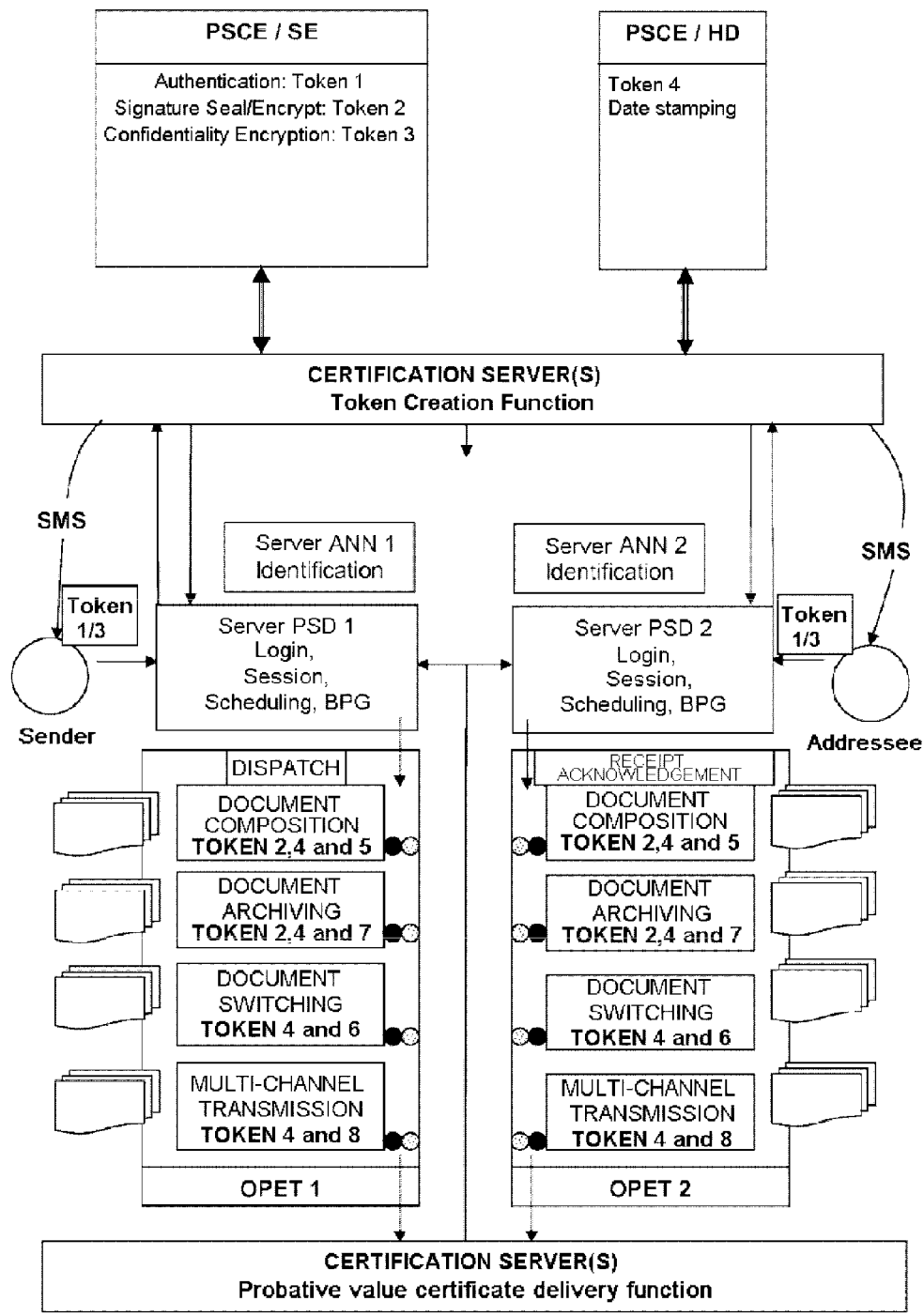
FIG. 2 shows the links between the various actors in a secure electronic correspondence system in one embodiment of the invention.

FIG. 2 shows the links between the various actors in a secure electronic correspondence system in one embodiment of the invention.

In one of the embodiments of the invention, a second important feature of a system for implementing the invention is to include the creation, for each type of correspondence, of a set of certification tokens. In the example in FIG. 2, the main tokens can be identified specific to each of the steps of the process of production of a secure electronic correspondence. These tokens are created by the certification server in the course of various sessions and sent to the various actors in the processing chain for the electronic correspondences processed during the session (PSD and OPET). Certain tokens must be validated by the PSCEs. The tokens are returned to the PSC-COR when they have received their last validation. When it has collected all the tokens coming from all the actors and verified the completeness of coverage of the processing operations for the correspondence, the certification server delivers a probative value certificate to the management server.

FIG. 3 shows the various types of session in which the processes for execution of secure electronic correspondence operations are implemented in one embodiment of the invention.

In one of the embodiments of the invention, a module 1341, 1342 is defined for management of secure electronic correspondence sessions which allows six types of sessions to be established which are briefly described hereinbelow.

The session of type $S_0$ is a point of entry common to all the other types of session. It allows the authentication not only of the user but of the whole of the actors that will be involved in the session to come (type $S_1$ to $S_6$). The number and the nature of the authentications to be applied at the stage of the session $S_0$ will therefore depend on the type of the session to come that the user will need to indicate when he logs in.

The session of type $S_1$ allows a sender user to put a set of documents into his BPG that he would like to transform into electronic correspondence. A session of this type manages, in particular, the choice of the electronic routing path and the creation and the flow routing of the certification tokens according to the type of correspondence.

The session of type $S_2$ allows the sender to validate by his signature, or that of a proxy, the dispatch of an electronic correspondence after composition.

The session of type $S_3$ allows an addressee to validate by his signature, or that of a proxy, the receipt of an electronic correspondence and to send, where required, an acknowledgement of receipt, after prior notification to the addressees of the arrival of a correspondence for their attention.

The session of type $S_4$ allows a sender user or addressee user to access their BPG in order to be made aware of the correspondences sent or received, work-in-progress (drafts, intermediate statuses, transmissions not yet validated, notifications of receipt not accounted, etc.) and also, potentially, to consult the various management rules to be applied to the management of the electronic correspondences specific to a user or a group of users, the management responsibilities and the universal correspondence agreements or the bilateral correspondence agreements.

The session of type $S_5$ allows a user to put documents to be archived into his BPG.

The session of type $S_6$ allows a user to validate by his signature, or that of a proxy, the archiving of the files handed over and hence to trigger said archiving by classifying the correspondences in electronic data.

To each type of session corresponds a type of certification (type $H_1$ to $H_6$, for the sessions of type $S_1$ to $S_6$, respectively) whose field and specifications are a function of the type of operation to be carried out in the type of session for which the certification is delivered.

Sessions of others types may be added (for example, a session specific to an invoice validation process such as a payment proposal) without the system implementing them necessarily straying from the scope of the invention which, rather than applying to a given set of sessions, applies to methods implemented within all of or part of said sessions.

Figure 4:
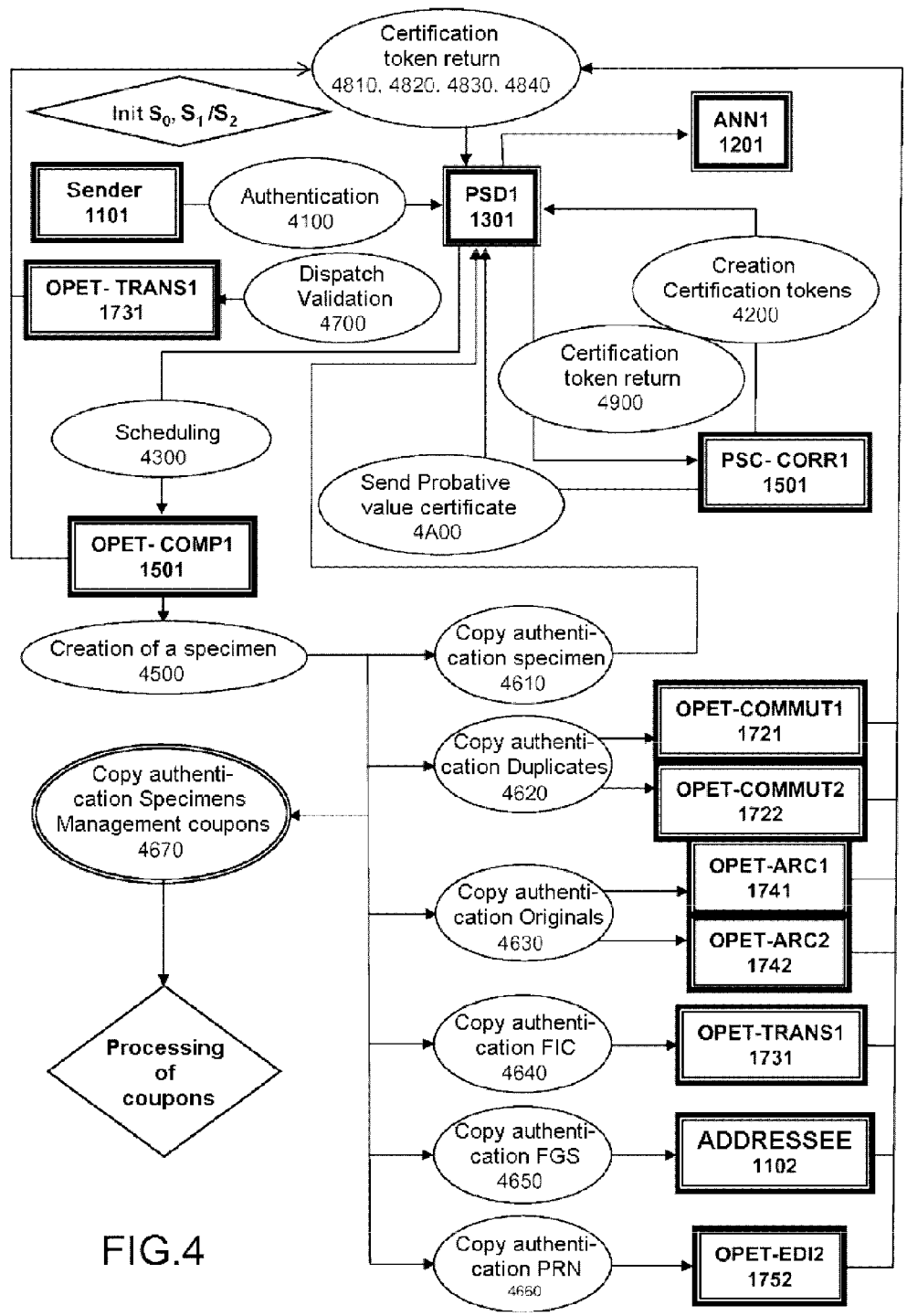
FIG. 4 shows a flow diagram of the processing steps for implementing the processes for execution of secure electronic correspondence operations in one embodiment of the invention.

FIG. 4 shows a flow diagram of the processing steps for implementing the processes for execution of secure electronic correspondence operations in one embodiment of the invention.

A certain number of principles allow the probative value of paperless electronic correspondences to be secured. Some relate to the components of the chain of trust, in other words to the reliability of the trustworthiness attributes of the actors in this chain (sender and addressee users, processing operators and providers of domiciliation address and certification services for the correspondences). These principles have been briefly described hereinabove and are the subject of the Patent Application FR 0956819 filed on 30$^{th}$ Sep. 2009. The verification of the trustworthiness attributes is carried out during specific processes executed in the course of secure electronic correspondence sessions (Init $S_0$, $S_1$, $S_2$). A session comprises a strong authentication 4100 of the user. Other principles or management rules cover the securitization of the processes in order to guarantee the end-to-end traceability of the operations and the integrity of the documents that are exchanged, and all this within an architecture capable of processing millions of documents per day. In one embodiment of the invention, these management rules are four-fold:

The execution of a correspondence operation is the subject of an execution report to the person who scheduled it;

One original of the electronic correspondence is uniquely held by each of the legal owners of said correspondence;

Any correspondence operation by a user is added to his consolidated correspondence account and has its counterpart in the consolidated correspondence account of at least one other user (principle of bilaterality);

Any correspondence operation corresponding to a management operation is caused, in other words has its basis, in a previous management operation or a certification.

The 1$^{st}$ principle allows it to be ensured that all the actors in the chain of trust not only have the necessary accreditations, but also use them in accordance with their object defined by the specifications of the service provider who is responsible for delivering a certification of the probative value of the correspondence operation (PSC-COR1). The preferred means for the operators and service providers to account for the operations that they execute is a certification token. The characteristics of these certification tokens are detailed in the comments to FIG. 5. The tokens are created by the server PSC-COR1, 1501 during a process 4200. At the end of the operations which are described in the following part, the OPETs return the certification tokens for their operations to the PSD1 in the course of several processes 4810, 4820, 4830, 4840 . . . . When the PSD1 has recovered all the certification tokens relating to a correspondence line, said tokens are returned to the PSC-COR1 containing a document probative value matrix during a process 4900. Lastly, the PSC-COR1 delivers a probative value certificate that it transmits to the PSD1 during a process 4A00.

The 2$^{nd}$ principle leads to several versions of the same document being created from one specimen, one per holder of which will have the nature of original and will be conserved in archives by a trustworthy specialized third-party OPET-ARC1, 1741. The working versions in circulation are only duplicates. The generation of specimens, of duplicates and of originals is a copy authentication operation 4610, 4620, 4630. It is carried out by a composition operator OPET-COMP1, 1711. These operations, the use of the versions and the management rules which are applicable to the latter are explained in detail in relation to FIG. 6. As will be seen, the copy authentication also allows the generation notably of structured management files (FGSs), of transmission files and of electronic publishing files.

The 3$^{rd}$ principle is described in detail in the Patent FR2900011. This principle of bilaterality implies that any correspondence movement is considered as an entry which can only go into a correspondence account (which is like a double-entry account) if its counterpart is recorded in another correspondence account; provisionally, a correspondence can transit via a standby account; the entry will not be passed on if the counterpart has not arrived after a settable time. In one preferred embodiment, it is implemented in a system according to the invention where a switching operator OPET-CMT1, 1721 holds a bilateral correspondence account (COB) of the sender and records in it a duplicate of each correspondence during a process 4620, a 2$^{nd}$ duplicate being recorded in the correspondence account of the addressee by the switching operator of the addressee OPET-CMT2, 1722.

The 4$^{th}$ principle is described in detail in the Patent Application FR 2911982. In one preferred embodiment, the OPET-COMP1, 1711 creates management coupons during a process 4400. The management of the management coupons in an improved embodiment in combination with the processes for monitoring of the versions and of the certification tokens is described in more detail in the comments to FIG. 7.

In addition, the PSD performs the scheduling of all the electronic correspondence operations by the OPETs during a process 4300.

FIG. 5 defines the certification tokens used by the processing steps in one embodiment of the invention.

The tokens which are defined for the implementation of the invention are certification tokens whose flow routing, in association with that of the documents that are the object of the electronic correspondence operation, allows the implementation of each of the sub-operations to be verified in accordance with the specifications defined by the PSC-COR or PSC-CORs who intervene in the electronic correspondence operation in order to ensure that the global and bilateral compliance is met.

In the embodiment described, 28 certification tokens have been defined. Depending on the division of the processes of production and transmission of the documents, it can be advantageous to provide more or less tokens. The definition of the tokens illustrated by the figure is not therefore in any way limiting. Each type of correspondence (TYPCO) in the universal nomenclature possesses a definite and characteristic number of tokens which determine its maximum probative value on the scoring scale for the correspondences defined by the PSC-COR.

The table in the figure indicates, for each token, its name and its use, together with the event that triggers a return token.

Each type of correspondence has a particular fingerprint which establishes its specificity, which preserves this specificity over a large number of copies produced, and which allows all the checks to be carried out in order to eliminate the non-compliant correspondences and, in the intermediate phases, the anomalies.

The fingerprint allows the legal proof of correspondence on legal and data processing security criteria to be produced for each "transmission" of correspondence.

By way of example, the fingerprint is taken of the registered letter with acknowledgement of receipt for a commercial form.

This registered letter appears in the nomenclature TYPCO and benefits from a score for the probative value and hence from a certification by the provider of certification services PSC-COR.

In this example, what the PSC-COR determines for this TYPCO will be described so as to be able to measure the probative value and, in the case of litigation, to produce the proof of said probative value.

In the nomenclature, the registered letter AR signed in a structured file (LRAR FS) has a score, and hence a probative value, of 20 out of 20. The score of the LRAR FS is established on several criteria which are represented by tokens. The dematerialization with a certain legal value is based on two categories of tokens: the tokens for domiciliation address provision and the tokens for copy authentication.

The tokens for domiciliation address provision are granted by the PSC-COR to the PSDs for:
Justifying the digital identity of each individual connected in a session:
S∘-$S_1$: up-load of the correspondence data
S∘-$S_2$: validation of the export documents
S∘-$S_3$: validation of the import documents (AR)

The PSD must justify the strong digital identity with a date stamping by either verifying the certificate of digital identity of the person by interrogating his electronic signature certification authority (PSCE-SE) by means of the PSC-COR, or by using a process of identification according to the Patent Application FR 0956819 filed on 30th Sep. 2009 in a session of type $S_0$.

It is after this verification that the PSC-COR delivers the certification tokens necessary for the PSDs, that of the sender and those of the addressees.

In the scenario where the Sender/Addressees pairs (3 in the exemplary embodiment) do not have an electronic signature and make use of a strong identification by loop including a mobile telephone such as described in the Patent Application FR 0956819 filed on 30th Sep. 2009, there will therefore be:
For the sender side:
1 token for the identification S∘-$S_1$ on PSD EXP (type J1);
1 token for the identification S∘-$S_2$ on PSD EXP (type J1);
Hence, 2 tokens on the Dispatch side on PSD EXP
For each addressee (3 in the exemplary embodiment):
1 token for the identification S∘-$S_3$ on PSD DES (type J1);

Hence, 3 tokens on the Addressee side
For 3 correspondences, there will be 2+3=5 tokens
For a single bilateral correspondence, there will be 2+1=3 Tokens
1 Token ID S∘-$S_1$ Submission (type J1);
1 Token ID S∘-$S_2$ Dispatch Validation (type J5);
1 Token ID S∘-$S_3$ Receipt Validation (type J14);
Overall, in order to justify the scheduling for which the PSD is responsible for each Sender/Addressee correspondence number or mailing, on the one hand the PSD of the sender, and on the other hand the PSD of the addressee, there exist for the scheduling:
Sender side, a Preparation Token (type J2) for the PSD with a Composition Token (type J3) given to the composition operator OPET-COMP, 1711;
Sender side, a Validation Token (type J5) for the PSD with a Copy authentication token (type J6) given to the composition operator OPET-COMP, 1711;
Addressee side, a validation token (type J14) for the PSD with a copy authentication token (type J15) given to his composition operator.

For each correspondence mailing there are therefore a fixed number of scheduling tokens:
PSD EXP 2 tokens: preparation (type J2), validation (type J5);
OPE EXP 2 tokens: composition (type J3), copy authentication (type J6);
PSD DES1 token: validation (type J14);
OPE DES1 token: copy authentication (type J15).

On the other hand, there are a variable number of tokens for the copy authentication whose exact number is determined by the nomenclature of the correspondence typologies.

For the registered letter AR signed in a structured file (LRAR FS), the following variable tokens may be enumerated:
Originals (2), hence two tokens (types J7, J8) that will be used by the archiving third parties OPET-ARC1, 1741 and OPET-ARC2, 1742;
Duplicates (2), hence two tokens (types J9, J10) that will be used by the switching third parties OPET-CMT, 1721 and OPET-CMT2, 1722;
Structured management file (1), hence 1 token (type J11) that will be used by the ERP of the addressee in automatic uniterm reading mode (Accompanied structured file, on the one hand, of a summary list of the management details incorporated into the file, and which must necessarily be integrated into the ERP or addressee computer, on the other hand, of a sender electronic signature to be verified upon receipt by the addressee computer);
Management coupons (n), hence tokens (type J12) used for the composition of the acknowledgement of receipt AR and of the n−1 documents derived from the main correspondence (there are as many tokens as there are management coupon(s) created by one or more successive copy authentications).

If there is only one management coupon intended for the AR (no derived document), in this exemplary embodiment, there are therefore in all 6 tokens for the copy authentication products intended for the archiving (2) and for the switching (2) of the two duplicates (bilateral movement of correspondence), for the transfer of a structured management file (1), and for the AR management coupon (1).

The processes executed in this exemplary embodiment may be detailed in the following manner:
On the PSD of the sender side:
After loading of his "table of correspondence tokens" by correspondence mailing or number, the sender PSD must send the data for each correspondence number or mailing needed for the processing of this EXP/DEST correspondence by the designated document operator with a composition token (type J3); the composition token is returned by the operator to his PSD as soon as both registered, date stamped and sealed specimens are subject to the validation by returning to the PSD with the "composition token" one of the two specimens in order to be subject to the approval of the sender in his BPG and to his dispatch order; a token vouching for the scheduling of the composition, called preparation token (type J2), is taken from the "table of the correspondence tokens" held by the PSD and is returned to the PSC-COR as soon as one of the two specimens appears in the BPG of the sender and the composition token has been returned to him with the registration, composition, sealing, and date stamping voucher;

When the dispatch order for each correspondence number or mailing, legally signed by the sender, has been validated, the sender PSD, 1301 generates a dispatch report, notifies the composition operator of the sender OPET-COMP1 of the validation, 1711 and supplies him with all the tokens needed for the copy authentication (types J7 to J12); a token vouching for the scheduling of the copy authentication, called validation token (type J5), is taken from the "table of the correspondence tokens" held by the PSD, and it is returned by the PSD to the PSC as soon as the composition operator has given the acknowledgement confirming the receipt of the tokens needed for the copy authentication; this acknowledgement is a message that could be accompanied by the provision of a structured management file (FGS) which could be introduced by the PSD into the BPG of the sender in order to enrich his management database using which all the indexed searches are possible for the correspondence mailing number thus processed; the copy authentication token will only be returned to the PSD when the composition operator of the sender OPET-COMP1, 1711 has assembled the proofs of the copy authentications, and sent the products of these copy authentications to the other operators with acknowledgement vouchers from them.

On the PSD of the addressee side, there only exists one scheduling function which allows the specimen of the AR (AR management coupon) to be validated and the appropriate copy authentication operations to be executed by the composition operator of the addressee OPET-COMP2, 1712:

When the receipt notice for each correspondence number or mailing, legally signed by the addressee, has been validated, the PSD of the addressee PSD2, 1302 generates a receipt report, informs the composition operator of the sender OPET-COMP1, 1711 of the validation and supplies him with all the tokens needed for the copy authentication (types J15 to J19); a token vouching for the scheduling of the copy authentication, called validation token (type J14), is taken from the "table of the correspondence tokens" held by the PSD of the addressee, and is returned by the PSD2, 1302 to the PSC-COR2, 1502 as soon as the composition operator of the addressee OPET-COMP2, 1712 has given the acknowledgement confirming the receipt of the tokens needed for the copy authentication; this acknowledgement is a message that could be accompanied by the provision of a structured management file (FGS) which could be introduced by the PSD2, 1302 into the BPG of the addressee in order to enrich his management database using which all the indexed searches are possible for the correspondence mailing number received; the copy authentication token will only return to the PSD2, 1302 when the composition operator OPET-COMP2, 1712 has assembled the proofs of these copy authentications, sent the products of these copy authentications to the other operators and received acknowledgement vouchers from them.

The tokens J20 to J28 indicated in the figure without comments have the following uses:

| J20 Report | PSD EXP |
| --- | --- |
| J21 Sealed DOC specimen | OPE COMP EXP |
| J22 archiving | OPE ARC EXP |
| J23 archiving | OPE ARC DES |
| J24 signed transfer | OPE TRANS EXP |
| J25 Report | PSD DES |
| J26 Sealed AR specimen | OPE COMP DES |
| J27 archiving | OPE ARC DES |
| J28 archiving | OPE ARC EXP |

These tokens are obtained by the PSC-COR of a PSCE-SE or of a PSCE-HD in order to be used either by the PSD for the dispatch reports (J20) and receipt reports (J25) or by the various OPETs (J21 to J24 and J26 to J28).

It is observed that, for a correspondence mailing number as a registered letter AR signed in a structured file (LRAR FS), the following are needed:

Tokens obtained from the ACs by the PSC-COR: 9 from J20 to J28;

A fixed number of tokens created by the PSC: 9 from J1 to J6 and from J13 to J15;

A variable number of tokens according to the TYPCO created by the PSC-COR: 10 from J7 to J12 and from J16 to J19, in the example of the LRAR FS;

In total, 28 tokens.

All of the tokens listed hereinabove appear in a document probative value matrix (MVPD) which allows the PSC-CORs to certify the probative value of the secure electronic correspondence operation according to the invention.

A PSC-COR must verify the electronic signature of the operators engaged in the process of dematerialization of the copy authentication at the time when the copy authentication is launched by the legal signature report. The sealing of the $2^{nd}$ specimen happens at the time of the execution—copy authentication; the $2^{nd}$ specimen is returned with the composition token to the PSD for the BPG, together with the structured file of the correspondence particulars (indexation in the management database); the $1^{st}$ specimen is, for its part, included in the dispatch report; when the PSC-COR receives the PVE PSD, it checks his electronic signature and all the electronic signatures involved in the sealing and the copy authentication of each correspondence mailing; the PSC-COR checks periodically (at least once per day, in a preferred embodiment) the validity of the electronic signature of the PSDs who sign the dispatch and receipt reports (PVE and PVR).

The PSC-COR has the exclusive use of the invitation system consisting, if the addressee does not have a correspondence account, or if he does not have a dematerialization agreement with the sender, in sending him an invitation to register and to join the universal correspondence agreement (CCU) and bilateral correspondence agreement (COB); this invitation is normally "open", in other words he is invited to choose between all the PSDs listed, unless there is a particular agreement between the PSC-COR and a PSD; the PSC-COR has the single use of the digital identification by the mobile in order to check all the session number, and all the codes that have instigated a legal session whatever the PSD and the country.

There exists at least one management coupon token, this being a document underlying or derived from the document of the main correspondence: AR or preceding or following document in a document series, for example, as described in the comments to FIG. 7.

Figure 8:
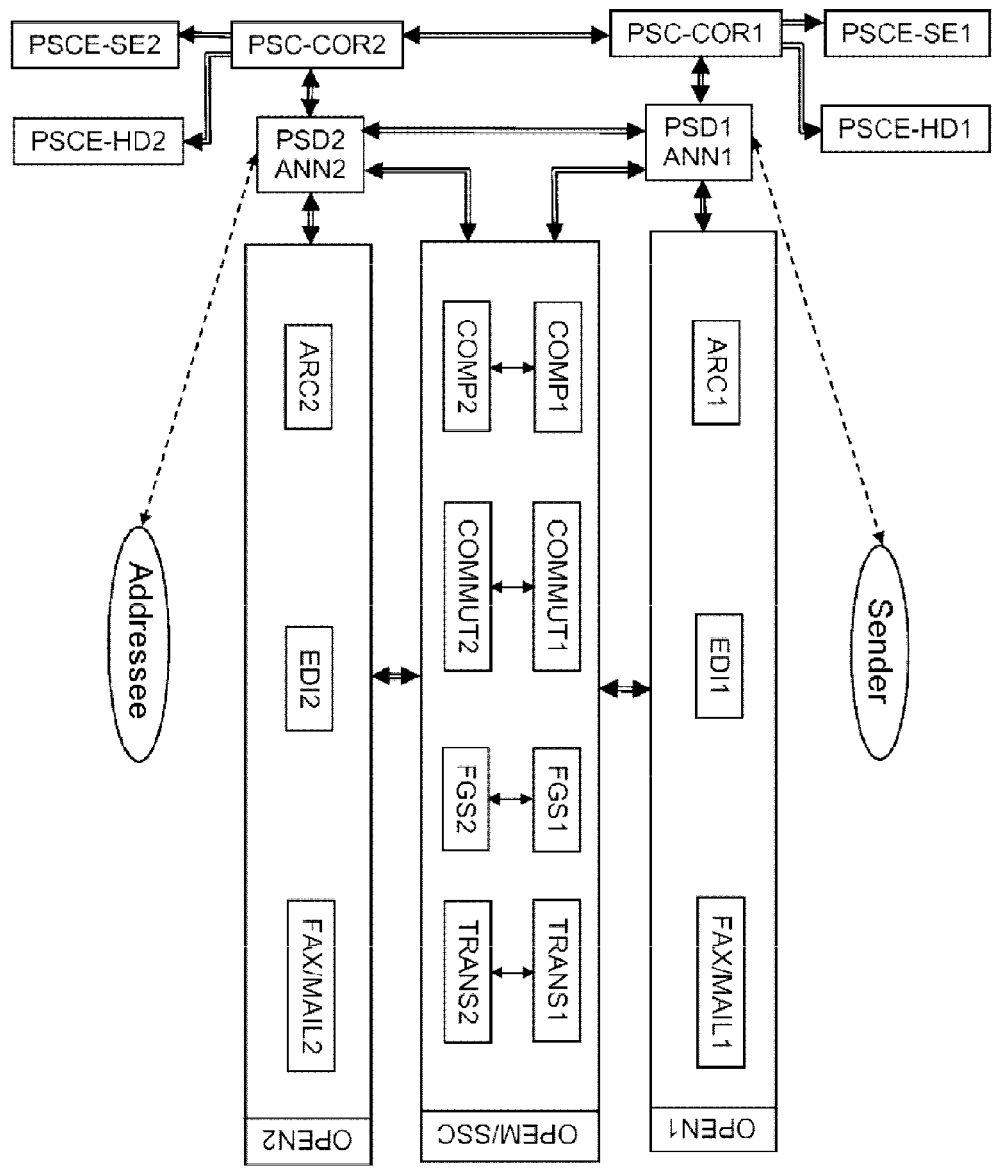
FIG. 8 shows the architecture of a shared services centre in one embodiment of the invention.

A Shared Services Centre can centralize at least the two composition and switching functions; this element is capable of modifying the localization and the flow of the tokens used by the composition operators and the other operators, as described in the comments to FIG. 8.

The transmissions depend for the products of the copy authentication on the type of network to which the sender and the addressee belong for each type of correspondence, as described later on in the description.

In order to ensure the traceability of the correspondences, each correspondence mailing is followed, as detailed in the Patent Application FR 0956819 of 30th Sep. 2009 by:
A procedure number S° supplied by the PSD;
A session number determined by the PSC-COR;
The digital identity in S° (SMS code created by the PSC-COR)
A root n° of the upload (ensemble of all of the multi-addressee data)
One mailing number per sender/addressee pair
One enrolment number which gives, per pair, the probative value matrix and the series of fixed and variable tokens (PSC)

The PSD submits for each pair and correspondence number to the PSC-COR in order to verify the attributes necessary for the addressee, its PSD, and its operators.

The allocation of the tokens is a function of the type of correspondence (TYPCO):
the data uploaded in HTTPS mode are sorted by type of correspondence;
for each type of correspondence, the PSD lists the correspondence pairs;
for each correspondence pair and type of correspondence there is one mailing number;
based on the type of correspondence and for each sender/addressee pair, the PSC-COR verifies that all the legal conditions are assembled prior to allocating a series of tokens called document probative value matrix (MVPD), on the one hand to the PSD of the sender for the dispatch, and on the other hand to the PSD of the addressee for the receipt AR.

The example of the LRAR FS is now reconsidered. The PSC-COR allocates, for each correspondence number:
a series of tokens for the sender PSD1, 1301: J1 to J12 (12), plus the tokens for the PSCEs, J20 to J24 (5), being a total of 17 Tokens;
a series of tokens for the addressee PSD2, 1302: J13 to J19 (7), plus the tokens for the PSCEs, J25 to J28 (4), being a total of 11 Tokens.

The overall total is therefore 19+9 tokens, equal to 28 tokens in total.

The PSD of the sender PSD1, 1301 then loads the table of correspondence tokens by sender mailing. The PSD will use 4 tokens to justify its own operations on the one hand for strong identification and on the other hand in communication with the OPETs. The PSD will transmit 8 tokens to the OPETs for execution. Furthermore, the PSC-COR has verified that the signatures used by the PSD and by the OPETs are valid by obtaining the validity voucher from their PSCE-SE.

The PSD of the addressee PSD2, 1302 also loads a table of correspondence tokens by addressee mailing (AR). The PSD will use 2 tokens to justify its operations for the strong identification and with the OPETs. The PSD will transmit 4 Tokens to the OPETs for execution. Furthermore, the PSC-COR has verified that the signatures used by the PSD and by the OPETs are valid by obtaining the validity voucher from their PSCE-SE.

The PSD of the sender PSD1, 1301 then launches the scheduling of the composition of the specimens:
1 token J2 for the preparation consisting in passing the data to the composition operator OPET-COMP1, 1711;
1 token J3 passed to the composition operator OPET-COMP1, 1711 for justifying the composition of two specimens, one returned sealed to the PSD1, 1301 for validation, and the other waiting for sealing after validation.

The PSD of the sender PSD1, 1301 then produces a validation report for the export specimen or specimens. A validation token is provided for each specimen having been the object in the BPG1, 1311 of a dispatch authorization with a legal signature certified by the PSD with a signed report. The PSD1, 1301 subsequently notifies this validation to the composition operator OPET-COMP1, 1711, gives him a copy authentication token J6, together with the tokens (J7 to J12) for execution of the copy authentication in several applications of the specimen: originals, duplicates, management coupon AR, management structured file, etc.

Figure 6:
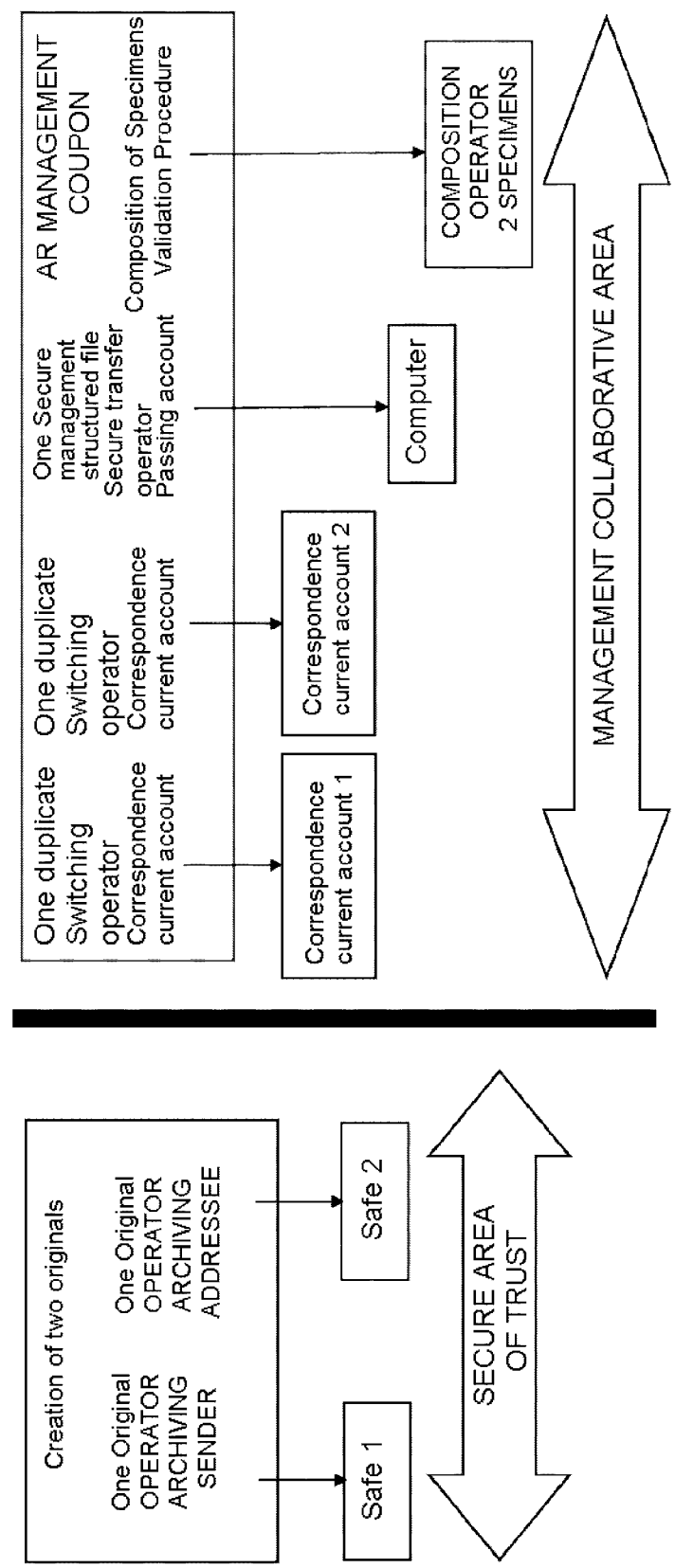
FIG. 6 shows a functional view of a mechanism for copy authentication in one embodiment of the invention.

FIG. 6 shows a functional view of a mechanism for copy authentication in one embodiment of the invention.

The copy authentication is the second phase of the composition of the document which, following the fabrication of a specimen of the document, allows the identification of the number of originals, of duplicates, of true copies, of management structured files, and of management coupons used for all the needs of the parties in transaction correspondence, according to the specificities of the TYPCO or of the series of several correspondences linked together, notably via an accounting and fiscal revision route. The copy authentication establishes, for example on the basis of the specimen of an order, the management coupons needed for the later generation of a delivery note, a delivery receipt, an invoice, an acknowledgement of receipt of invoice, a payment order, etc. . . . These management coupons can provide the faculty to carry out complementary, further, and specific operations over a certain time period, starting from an initial document operation recorded in the table of the certified correspondences. For each version of a document specimen validated by the sender, the copy authentication establishes the specific content of the new version depending on the nature of the legal document to be established and on its final use. In addition, this copy authentication may also submit the processed document for date stamping and for sealing in order to guarantee its integrity and date.

The copy authentication of an invoice specimen, in accordance with the dematerialization model for a tax invoice with probative value, consists in creating for example 2 signed invoice originals for two archiving safes of the parties, 2 PDF duplicates introduced into their two current correspondence accounts, and a management coupon BAP, payment order allowing the addressee customer, within a settable time period, to accept and pay the invoice (for authorizing its discount or its payment). When the addressee—customer wants to apply this faculty for accepting and payment, he can only do it by applying the management coupon which establishes a durable link between the invoice and the document explicitly confirming the payment order.

It is therefore the process of copy authentication which commits the number of management coupons necessary for the implementation of the later operations.

Each management coupon attached to the later operation, whose creation it legitimizes, transports generic data that are indispensible for the content of the new document to be established. The management coupons carry data or mandatory legal statements which are decisive for the legal value of the documents for which they are intended. The management coupon, created by the copy authentication of a validated document specimen and legally signed on line by its generator, has a limited lifetime so as to prevent the creation of a planned following document, and in the document series, beyond a certain time period or a certain date. For example, the period of time for creation of an invoice from an order can be limited by indicating the 31st of December because the change of public rates and of company accounting period prohibits any later invoicing on the basis of the reference of the initial order. In other words, the lapse of the order is applied beyond a certain time period and this is communicated to the relevant parties by an alarm.

The copy authentication operations are now detailed.

The scheduling of the server PSD1, 1301 starts by sending to the composition operator of the sender OPET-COMP1, 1711 the number of correspondence orders and mailings to be dispatched to the addressees indicated. For each correspondence order and addressee, with the data file to be processed, there is the composition token associated with this dematerialization function. For each correspondence mailing, the composition operator is responsible for generating 2 specimens for the account of its sender member. For the two specimens established per correspondence mailing, the composition operator applies a unique registration number identical for the two specimens. The composition operator returns into the BPG1, 1311 of the sender on the server PSD1, 1301 one of the two specimens that the sender will need to validate in order to trigger the effective dispatch. As long as the sender has not explicitly validated "the mailing in the process of validation", the OPET-COMP1 keeps a specimen with the corresponding token on standby, and the dematerialization procedure is waiting for a validation.

The sender notified by email of the existence of one or more "mailings in the process of validation" goes to the interface of his BPG on the server PSD1, 1301 in order to choose the specimens of correspondence that he wishes to send. For each mailing that he wishes to send, he will double-click on "SEND" which validates his wish to send. The person notified logs into the session S∘ for personal identification, and they choose the session $S_2$ for the "validation of the mailings to be sent". Of course, if this person has not been certified to validate by the holder of the consolidated correspondence account, he will not be able to log into the session $S_2$.

A report is generated by the PSD at each session $S_2$ establishing the link between the strong identification operated in S∘ (1), the specimens chosen by double-clicking (2), and the double-click associated with a date stamping (3). This link between 1, 2, and 3 is equivalent to a legal signature by the sender: this is a dispatch legal signature for the content of the document with the address of the addressee. The PSD signs this file associating the three elements and records it in his dispatch report journal.

In order to guarantee the integrity of the legal signature file, the operator carries out a sealing of this "Legal signature structured file" with a condensed version SHA1 so as to have an incontestable "record of legal signature". This file is stored on a reserved archive server WORM. A true copy of the "legal signature structured file" with a sealing SHA1 is transmitted to the PSC-COR who carries out a compliance check on the summary list of the legal signature structured file, together with a coherence check with respect to his database. He signs this "Legal signature structured file" electronically before archiving it in an electronic safe, and before transmitting the audit track to the escrow server of a bailiff. This audit track comprises its checks and the signed copy of the legal signature structured file. The bailiff's escrow certificate allows the PSC-COR to deliver a probative value certificate for the legal signature of the document (dispatch or AR). This certificate is essential for obtaining the final overall certification of the electronic correspondence according to the scale of probative value established by the PSC-COR and delivered by him to the parties and to their respective operators.

After validation of the sender and recording of the signed report in its journal, the server PSD1, 1301 transmits to the composition operator OPET-COMP1, 1711 the identical registration numbers characterizing the "validated specimens", adding to them, for each mailing to be generated, the tokens needed for the provision of the model service TYPCO.

The composition operator OPET-COMP1, 1711 obtains the registration numbers of the validated specimens and can then seal the specimen that he has kept to himself for each correspondence mailing to be generated. He subsequently returns the token J3 to the server PSD1, 1301 with the voucher for the log file reserved for the composition of the document specimen whose status is "correspondence to be dispatched signed".

As soon as the composition token J3 has been returned, the OPET-COMP1, 1711 which has received the tokens for the services remaining to be executed on each correspondence mailing launches the execution procedure. This starts by the copy authentication which consists in using the sealed specimen reserved for each correspondence mailing to create a limited number of versions (VERS) of the correspondence or of the files in accordance with the specifications stipulated by the TYPCO, in other words the specifications for this type of correspondence chosen by the sender.

The versions that may be envisaged are:

Two originals (ORI) with two tokens (J7, J8) to be deposited in the legal or official archive of the two parties with their third-party archiving operators, OPET-ARC1, 1741 and OPET-ARC2, 1742;

Two duplicates (DUP) with two tokens (J9, J10) to be moved into the two current correspondence accounts (CCC) with their third-party switching operators, OPET-CMT1, 1721 and OPET-CMT2, 1722;

Where needed, a printing file (PRN) with a token designed to be used for printing and posting with the third-party electronic publishing operator OPET-EDI1, 1751 (printing, putting into an envelope and posting);

Where needed, a structured management file (FGS) with a token J11 designed to be sent via secure transmission to the computer of the addressee which will be readable by a method for "automatic uniterm reading" of the mandatory or contractual statements prepared on demand (communications protocol AS2 for rendering the network secure with no intermediate trustworthy third party);

Where needed, a file with a token intended for multi-channel transmission carried out by a transmission third party, OPET-TRANS1, 1731 (secure fax or mail); if there is an operation of the fax or mail type to be sent via a national operator, the file created in the copy authentication for this purpose will have a token that will have been provided by the PSD at the time when the sender validated the dispatch (and originally coming from the PSC-COR);

Where needed, a file with a token called management coupon designed to create, from a data file, a new document derived from the first and established later on by another person, either the sender or the addressee; this is not the same person who is appointed depending on whether a complementary document is created for an AR or for a payment proposal PP, for example; this data file characterizing the management coupon is transmitted with the token to the third-party composition operators designated by the procedure TYPCO in question.

However, other versions may be envisaged as long as this is agreed between the parties (PSC-COR, PSD, OPET and users).

The management coupon is a file which contains the data needed for establishing later on a document derived from the preceding one, the document of the main correspondence. This data file is structured to be able to be automatically used by the third-party composition operators. It carries the name of its main object (AR, PP, etc.) together with the reference of the root document: Letter/AR or Invoice/Payment proposal. When the initial composition operator has established this management coupon, he transmits it with the token to the operator responsible for the composition of the derivative document (AR, PP, etc.) in the form of 2 specimens.

The operator responsible for the composition of the derivative document establishes two specimens. He keeps one of them with the token and he transmits the second to the PSD who manages the BPG of the person designated for validating it.

The person notified of the creation of the AR or PP document in the form of a specimen to be validated logs into his BPG via the sessions $S_0$ and $S_3$. The session $S_3$ is only used to validate the ARs for correspondence mailings being held in reception or to be received from other management coupons. The person identified in $S_0$, accessing by the appropriate certification $S_3$, displays the specimen of the correspondence mailing waiting for reception. After execution of a double-click by the user on the reference of the AR or PP specimen, the server PSD establishes the receipt report PVR by automatically associating the identity of the person authenticated (1) in $S_0$ with the AR or PP specimen corresponding to the initial management coupon (2), and with the date stamping of the double-click (3) which represents the wish of said person wishing to read or consult the correspondence mailing received from the sender, or wishing to pay the invoice being held for payment.

This link between 1, 2, and 3 is equivalent to a legal signature by the addressee or by the person logged in: this is a legal signature for receipt of the content of the document with the indication of the sender. The server PSD signs this file associating the three elements and records it in his receipt report journal. The legal signature report can just as easily be produced on the specimen of a payment order.

As soon as the report is signed by the server PSD, the latter notifies the composition operator that the specimen has been accepted or validated, and he supplies him with the reference of the corresponding receipt or payment report, and the number of tokens needed for obtaining from the designated operators the copy authentication processing operations which are allocated to them, essentially those needed for the archiving of the two AR or PP originals, and needed for the switching of the AR or PP management duplicates introduced into the correspondence accounts.

The composition operator who has conserved the duplicate of the AR specimen can then execute the sealing of the specimen available to him, and finally return the token with the justification of his operation logged in his composition general ledger.

Two types of operations are then immediately undertaken: on the one hand, the reading of the correspondence mailing or of the payment orders which become accessible in the correspondence account (or in the state of payment), and on the other hand, the execution of the copy authentication operations specific to this type of AR or PP document. The copy authentication will therefore consist in creating two originals to be given with the two tokens to the archiving third parties concerned (that of the sender and that of the addressee), and two management duplicates to be given with the two tokens to the switching third parties concerned (that of the sender and that of the addressee) since they hold the correspondence accounts.

The composition operator of the sender OPET-COMP1, 1711 subsequently carries out two types of processing:

1. On the one hand, he uses the $2^{nd}$ specimen to create two originals.

These two originals each have a token (J7, J8); each original with its token is given to the electronic archiving third parties OPET-ARC1, 1741 and OPET-ARC2, 1742; a date-stamped deposit number is confirmed to the composition operator OPET-COMP1, 1711; the archiving tokens are returned with the vouchers for the deposit to the PSD1, 1711; the PSD1, 1711 then sends in return a certification of archiving for this deposit number.

No original can be consulted by its owner because he does not have access to his safe to be able to justify the integrity of the archived originals. He can, on the other hand, consult the management duplicates in his consolidated correspondence account. He can however transfer his original from his safe to another safe as long as the certificate of archiving has been returned into the safe. No safe accepts an incoming transfer of an original if it is not accompanied by its probative value certificate for the original composition, and for the legal archiving with probative value. There is a total separation between the authorized flow and movements of originals from safes to safes with their certificates delivered by the PSD/PSC-CORs, and the other media of the copy authentication which transit via correspondence accounts or management accounts. This dichotomy guarantees the original nature of an electronic file since if it is created in the network of the electronic safes with the voucher token, it is by nature an original document and it can never "pass" into the management network which makes the correspondence accounts operate and management interfaces accessible to the users. Thus, it can be guaranteed that the original document is not reproducible since there is no passage between the circuit of the name-registered electronic archiving safes and the document management accounts.

Each original is given to the archiving third party who acts either for the sender or for his customer. Depending on the type of network, and on the organization of the "Shared Services Centre", a secure routing is defined for sending the information on the composition operator and on copy authentication to the executing operator for the electronic archiving. The various routing procedures are defined further on in the description.

2. On the other hand, it uses the $2^{nd}$ specimen to create a specified quantity of document products.

All these document products are management documents and, for this reason, they are accessible and even reproducible in collaborative management mode, and depending on the certifications of the individuals recorded in each correspondence account by the holder of the account: employees, managers, ad hoc representatives, etc.

By way of example, for the copy authentication of the LRAR FS, the typology and the score of the probative value have been determined by the PSC-COR in the following manner:

Two duplicates accessible in correspondence accounts;
One management structured file designed to be sent to a remote computer capable of performing the "automatic uniterm reading" secured by a communications protocol secured by an electronic signature and a justified acknowledgement of receipt of the MDN type, in other words an acknowledgement of receipt signed and automatically returned to its sender with the obligation to provide the proof to the addressee that the latter (AR) has truly been archived; this communication is for example carried out by a protocol of the AS2 type; as long as the sender of the file has not received the signed AR from the addressee, and archived this AR after having checked the validity of the electronic signature of the AR, he does not have the right to destroy the file that he has sent with final success to the addressee;
One management coupon.

The management coupon is a structured file designed to be sent to a remote operator in order for him to prepare and compose a document underlying or derived from the first: an acknowledgement of receipt on a letter, an invoice on an order, a payment order on an invoice, etc. As soon as the two specimens of the secondary document, underlying or derived from the first, are composed, the person responsible for its management and for its "activation" is notified, and one of the two specimens is made available to him in his BPG, with his PSD. Subsequently, in order to activate his correspondence, the procedure for document validation and copy authentication will be identical to the general procedure.

Figure 7:
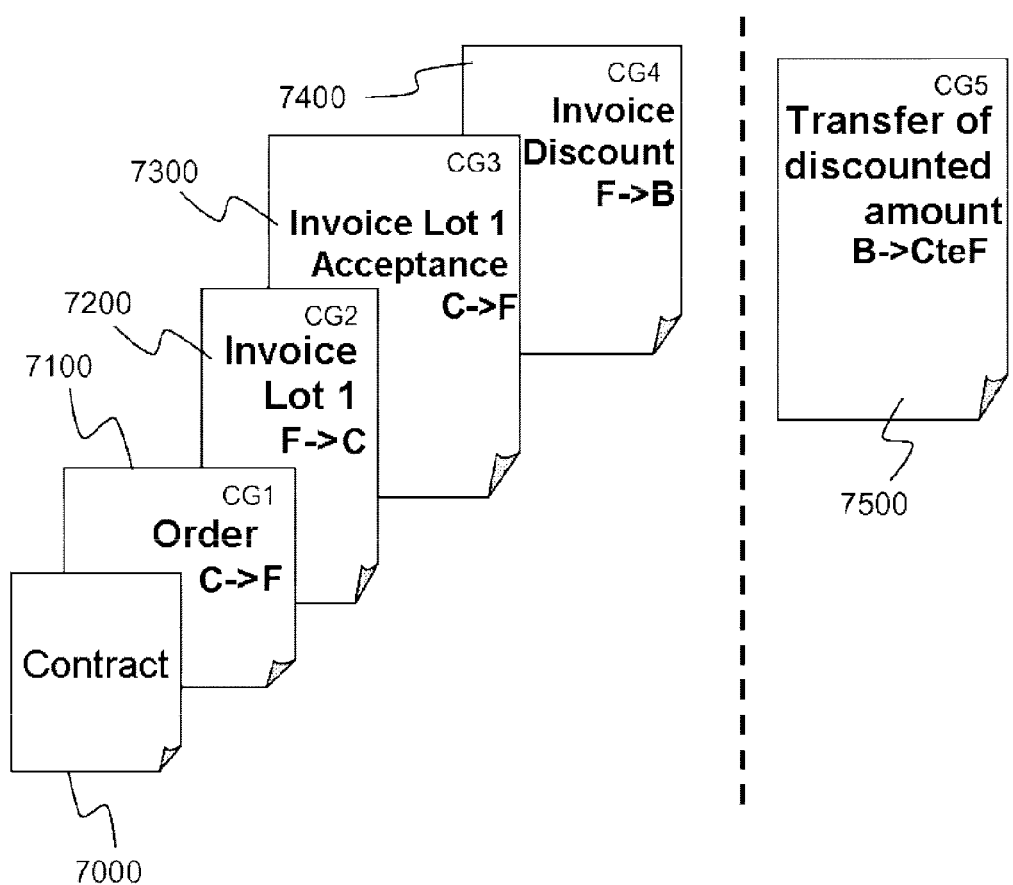
FIG. 7 illustrates the process for use of the management coupons in a series of management correspondences in one embodiment of the invention.

FIG. 7 illustrates the process for use of the management coupons in a series of management correspondences in one embodiment of the invention.

In a management process, which must be auditable, a "management series of electronic correspondences" is defined which must necessarily comply with the rules of "matching" and of "backing" in order to conform, on the one hand to the legal constraints on security and on legality, and on the other hand to the management constraints designed to improve the quality and the performance of the administrative management, notably for determining the legal result of management.

"Matching" is defined as the link between two documents connected via a management function, for example the link between an order and an invoice in order to justify the act of management in accounting. Matching is a legal means of managing one file with legal probative value by irrevocably attaching one economic document to another, notably for the balance sheet, the off-balance sheet, and the trading account which are certified by an auditor (CAC).

"Backing" is defined as the link between two documents established by operators of a different nature, for example, an invoice established by a processing operator for electronic correspondence and a payment effected by a "monetary operator" such as a bank. Another example that may be mentioned is an invoice in currency backed up by a bank loan, by a factoring credit and by an exchange rate protection. The backing is a measurement of security for ensuring the "causality" between an invoice and its payment processed by two operators of a different nature.

The backing is a financial measurement for guaranteeing for example the correspondence of the values between an invoice and its forward exchange rate protection, because an export contract covered by a guarantee an agreement on the parity 1€=1.50 $ irrevocably values 1 billion € at 1.5 billion $ over the duration of the coverage, for example, 1 year. Any substitution or alteration of the guarantee can fraudulently make considerable amounts of money generated by the differences between an invoice conserved with a processing operator for electronic correspondence and the guarantee conserved by the guaranteeing bank. If there is no communication between these two operators of different nature, or if this communication is not honest, fraudsters have a very easy means of modifying the backing documents by changing their content or substituting them with documents whose difference is not apparent at first sight, especially in the middle of millions of data processing documents.

There exist legal or conventional document series set up for each commercial and financial document chain, notably for the chains in force in large industrial organizations for motor vehicles, for distribution, etc. It is mainly the supply chain which comprises the order, the delivery note, the delivery receipt, the invoice, the credit, the factoring acceptance, the letter of intent, the payment agreement, the payment order, and the bank confirmation of payment.

At each step in the document creation, it is checked that the previously dematerialized documents really exist and that they are certified as having probative value, in order to avoid launching new operations and document confirmations without cause that could risk generating fraud.

The legal constraints are severe, notably for listed companies and banks who must prove that the documents are suitably matched in the logical order of their functional and accounting (chain of transactions) framework, and that in any possible scenario, no-one has been able, at a later date, to alter these economic links notably by substituting for a document coming into the management chain another later document, different from the first, and altering the economy of the operations or their final result.

The matching constraint therefore consists in systematically verifying the semantic, historic and logical link between the documents for transactions coming into the same management chain. This consists in guaranteeing that each link is unalterable and well protected in legal electronic archiving and, even more precisely, classified in the reference file of the accounting revision path. The management of the matching checks therefore ensures not only the legal management link between the document operations, according to the accounting, tax, and contractual rules, but it also ensures their allocation and their long-term and faithful conservation in the reference file reserved for the conservation of professional documents according to a mode of classification conforming to the management control.

The matchings are links established according to specific management rules for each series of electronic documents, and these matchings are sealed and date stamped in order to preserve the integrity of the economic and legal links between the operations, and in order to avoid pre-dating of certain items in the files held for the "accounting and tax revision path". Since the accounting certification relies on the security between millions of balance sheet operations, the auditors require an increasing number of data processing proofs that ensure the security of the matchings and of the backings. The banks, for their part, in view of the anti-laundering laws, are obliged to obtain the justification for all commercial and financial payments.

In the system and the method of the invention, management coupons, derived from the main correspondences, have the role of allowing the verification of the matching and of the backing.

At each step in the constitution of a transaction and of an appropriate correspondence document, coming into a document management series, and committing a sender and an addressee to a bilateral and contractual relationship, there exists an obligation to generate as many management coupons as there are possible transactions within the series of this document management.

The management coupon is a traceability element which allows the later steps to be made aware of the characteristics or the antecedents of the operation being created so as to carry the necessary historical information, to legitimize or to ensure the regularity of the operation underway in complete transparency; the management coupon thus allows the legal value and the compliance of the correspondence and management operations to be established with respect to the internal and external management procedures and to the legal dispositions.

If a commercial transaction is created without being based on the existence and the probative value of the management coupons from the preceding operations which authorize its dispatch and its signature, this transaction is impossible to carry out in an electronic data processing sense and the process of implementation will be preventively blocked by the processing operator and will generate an alarm for the users so as to avoid electronically archiving a null and void operation which might not have been detected beforehand.

The management coupons of a document series must all exist in order to demonstrate the legality of the chain of transactions and in order to establish the legal value of its operations prior to legally archiving them on either side, with the sender and with the addressee. The management coupons establish the legal probative value of the operations coming into the transaction chain and allow it to be ensured that these operations and their dematerialized documents are intrinsically identical or symmetrical, and conserved in complete data processing security in the legal electronic archiving safes of persons involved in the transaction chain.

The management coupon is an essential element not only for ensuring the security of the exchanges of documents with probative value, by verifying that the basis of a new document is well established by the management coupons of the earlier operations, and hence by their regularity, but it is also an essential element for the certification of the probative value. The certification of the probative value of a "document series", appearing in the "table of the rated or certified correspondence documents", is based not only on the compliance of the processes implemented, but also on the specificity and the number of coupons needed to be established in the earlier phases of document dematerialization.

Without the exhaustivity of the coupons and their systematic use at every stage of the dematerialization of the document series, the certification of the probative value of the final document cannot be obtained from the independent certification authority who is the electronic document certification service provider, and as a consequence the final document cannot be introduced by the archiving third party into the electronic safe with a certain legal value.

This safeguard is also necessary when it is envisaged to transfer an original electronic document from one electronic safe to another hosted and secured by another archiving third party: In other words, the parties use two different trustworthy archiving third parties or would like to transfer later on their original document to a third party whose domiciliation address is with another archiving third party. The archiving third party who receives a transfer of an original document declared to be of certain legal value must be able, for the security of its customer, to verify that said document received is "certified" as having probative value by an independent authority, and that the legal proof can be produced instantaneously by a click accessing the management coupons which have established its legal characteristics and the traceability from its origin. It is, for example, an essential control when a supplier transfers the invoice document, which is a bona fide financial asset, to a banker or to a factor who purchases the invoice as a debt in order to finance the ceding business. On an invoice file, it is difficult to prove that one of them is an original since the file can be reproducible ad infinitum. As long as the management coupons are attached to the invoice file, the traceability for the generic operations and the proof of holding the original is maintained.

A part of the processes to be applied when management coupons usable for the validation of a document management series are created is described in the French Patent Application FR 07/00648 of Jan. 29, 2007 filed by the Applicant. These processes are however greatly improved by the process of copy authentication and the process of dispatch/return of certification tokens specific to said management coupons.

In particular, in the system of the invention, the process of creation of the management coupons forms part of the process of copy authentication. With reference to FIG. 4, this process 4670 is carried out in parallel with the creation of the originals and duplicates and is the reason for the transmission by the PSC-COR of a specific token to the PSD who transfers them at the time of the scheduling to the OPET-COMP. The return of this token to the PSC-COR via the PSD is proof of the correct execution of the copy authentication of the management coupons. In the example in FIG. 7, the main correspondence is the notification of a signed contract 7000 by a customer to a supplier; as illustrated in FIG. 4, this contract can comprise management coupons:

One management coupon CG1, 7100 which is an order intended to be sent by the customer to his supplier;

One management coupon CG2, 7200 which is the invoice for one lot of the order intended to be sent by the supplier to his customer;

One management coupon CG3, 7300 which is an invoice acceptance intended to be sent by the customer to his supplier;

One management coupon CG4, 7400 which is an invoice discount intended to be sent by the supplier to his bank;

One management coupon CG5, 7500 which is a money transfer order for applying the credit for the net discounted amount to the account of the supplier in the bank ledgers.

In the system of the invention the customer, the supplier and the bank can sign correspondence agreements that notably define a type of correspondence such as the document management series comprising the 5 management coupons described hereinabove. In the framework of said agreement, the parties accept for example to only be able to send invoices by electronic means based on management coupons derived from orders. The wording of the invoices is therefore predetermined and cannot be changed. The documents composed using management coupons CG1 to CG4 are therefore naturally matched. The money transfer document coming from CG5 will also be naturally backed by the underlying invoice which is itself matched to the order and hence to the contract. As a variant, it could be that the management indications such as the invoiced amount, the discount rate, etc. appearing on the documents coming from the coupons might take values different from those specified at the outset but, within predetermined ranges. The compliance with the stipulations of the correspondence agreements applicable to the document management series must be ensured by the actors in the chain of trust, here in particular the PSD or PSDs and the composition and switching OPETs of the customer, of the supplier and of the bank.

FIG. 8 shows the architecture of a shared services centre in one embodiment of the invention.

A shared services centre (SSC) groups, for reasons of efficiency, the functions which can easily be delocalized for the majority of users of the system according to the invention, sender and addressee, such as the composition (COMP1 and COMP2), the switching (CMT1 and CMT2), the preparation of the FGS (FGS1 and FGS2) and the transmission of files for printing or sending of faxes or local e-mails (TRANS1 and TRANS2).

The archiving functions (ARC1 and ARC2), the preparation of the files for electronic publishing (EDI1 and EDI2) and the sending of the faxes or local e-mails are, if it is not possible to share them, carried out by national or regional operators, OPEN1 and OPEN2.

The functions of the providers of domiciliation address services, PSD1 and PSD2, are normally also national, as are the functions of the providers of certification services for correspondence, PSC-COR1 and PSC-COR2. The directory holding functions, ANN1 and ANN2, are shown in the figure as carried out by the PSD1 and PSD2, but may also be provided by independent entities. The PSC-COR1 and PSC-COR2 must respectively interrogate periodically the PSCE-SE1, PSCE-HD1 and PSCE-SE2 and PSCE-HD2, competent for their geographical area, to check the validity of the signatures of the actors in the chain of trust and to submit requests for date stamping.

The communications between functions within the SSC for the correspondence operations whose counterpart function is in the same SSC are represented by arrows with single lines. This signifies that they can take place in local-area network mode, said local-area network being isolated from the outside world. The communication of the files and data can take place in Pass File (PF) mode, without secure routing protocol. On the other hand, the communications between the SSC with the OPENs, with the PSDs and between the PSDs and between the PSC-CORs, which are represented by double arrows, take place over a wide-area network, in Switch Out (SWO) mode, by using a secure routing protocol presented in the following part of the description.

The communications between the sender and the PSD1 and between the addressee and the PSD2 take place over the public telecommunications network, using a single protection mode, either HTTPS for the connections (completed by a procedure for strong authentication during a session of type $S_0$ already mentioned), or a protocol of the AS2 type for the transfers of files.

FIG. 9 shows the functional flow diagram of a method for encryption of a document to be archived with escrow of the encryption key.

Several encryption procedures are possible for preserving the confidentiality of the archived documents in the electronic safes of the users by the OPET-ARC of the sender 1741, or by the OPET-ARC of the addressee 1742.

Each of the three procedures can be implemented at the stage of the copy authentication of the specimen, on the side of the sender and on the side of the addressee of the document. According to the invention, the copy authentication operation comprises the creation of at least two originals (one, DOC1, to be archived by the OPET-ARC 1741 of the sender, the other to be sent to the addressee and archived by its OPET-ARCD 1742) and at least two duplicates (one, DOC2, to be conserved in the current correspondence account (CCC) of the sender, the other to be sent to the addressee and conserved in the CCC of the addressee).

The first procedure is illustrated in FIG. 9. In this procedure, which does not require the use of an electronic signature key:

Two identical symmetrical encryption keys, SYM1 and SYM2, are created at the time of the copy authentication 4610 by the PSD 1301, 1302 in the BPG 1311, 1312; these keys are specific for each document;

The first copy of the key SYM1 is used for encrypting the duplicate DOC2 which is stored in the current correspondence account CCC and the original DOC1 which is transmitted to the OPET-ARC to be archived;

The second copy of the key SYM2 is encrypted with the public key of a key escrow third party SEQ and is transmitted to said escrow third party after encryption.

The token of acknowledgement for the archiving operation is a notification of the encryption by SYM1. An additional token is created to acknowledge the operation for encryption by SYM2 and for escrow of the encrypted key.

In this procedure, the user can access the duplicate DOC2 in his CCC by decrypting it with the copy of the key SYM1 which is in his BPG. He cannot access the original DOC1, except by making a removal from archiving which breaks the chain of trust. Nor can he read the duplicate DOC2 on his workstation, because he does not have the key SYM1 available on said workstation, except by compromising the secret of said key by also transferring it. In the case of necessity (loss or destruction of the key copy SYM1, disappearance of the user, rogatory commission, etc.), an authority certified to this effect can recover the encrypted key SYM2 from the escrow third party, get him to decrypt it and thus gain access to the plain text documents DOC1 and DOC2.

FIG. 10 shows the functional flow diagram of a method for encryption of a document to be archived without escrow of the encryption key.

In this procedure, the public key for the electronic signature of the user is used. This procedure is as follows:

As in the procedure presented hereinabove in the comments to FIG. 9, two identical symmetrical encryption keys, SYM1 and SYM2, are created at the time of the copy authentication 4610 by the PSD 1301, 1302 in the BPG 1311, 1312; these keys are specific for each document;

The first copy of the key SYM1 is used for encrypting the duplicate DOC2 which is stored in the current correspondence account CCC and the original DOC1 which is transmitted to the OPET-ARC to be archived;

The second copy of the key SYM2 is encrypted with the public key for the electronic signature of the user then transmitted after encryption to the local workstation of the user;

As a variant, the copy SYM2, encrypted with the public key for the electronic signature of the user, can be archived by the OPET-ARC with the original document DOC1.

The token of acknowledgement for the archiving operation provides notification of the encryption by SYM1, and potentially the archiving of the key copy SYM2 encrypted with the public key for the electronic signature of the user. An additional token is created to acknowledge the encryption operation for SYM2.

In this procedure, the user can access the duplicate DOC2 in his CCC by decrypting it with the copy of the key SYM1 which is in his BPG. He cannot access the original DOC1, except for undertaking a removal from archiving which breaks the chain of trust. However, he can access the duplicate DOC2 on his local workstation by transferring a copy of it onto his station, by decrypting the key SYM2 which is present on said station with the private key for his electronic signature, then by using the decrypted key SYM2 to read the document DOC2. In this procedure, however, in the case of loss of the two key copies SYM1 and SYM2, it is no longer possible to access the documents DOC1 and DOC2, except if the key SYM2, encrypted with the public key for the electronic signature of the user, has been archived by the OPET-ARC with the document DOC1.

FIG. 11 shows the functional flow diagram of a method for encryption of a document to be archived with escrow of the encryption key which preserves a local access for the user to the archived document.

In this procedure, the public and private keys for the electronic signature of the user are used. The procedure is as follows:

- At the time of the copy authentication, an additional duplicate DOC3 is created;
- As in the procedure presented hereinabove in the comments to FIG. 9, two identical symmetrical encryption keys, SYM1 and SYM2, are created at the time of the copy authentication 4610 by the PSD 1301, 1302 in the BPG 1311, 1312; these keys are specific for each document;
- The first copy of the key SYM1 is used for encrypting the duplicate DOC2 which is stored in the current correspondence account CCC and the original DOC1 which is transmitted to the OPET-ARC to be archived;
- The second duplicate DOC3 is encrypted with the public key of the user then transferred onto the local workstation of the user;
- The second copy of the key SYM2 is also encrypted with the public key for the electronic signature of the user then transmitted after encryption to a key escrow third party SEQ.

The token of acknowledgement for the operation of archiving is notification of the encryption by SYM1. A first additional token is created for acknowledging the creation, the encryption and the transfer of the second duplicate DOC3. A second additional token is created for acknowledging the encryption operation by SYM2.

In this procedure, the user can access the duplicate DOC2 in his CCC by decrypting it with the copy of the key SYM1 which is in his BPG. He cannot access the original DOC1, except by undertaking a removal from archiving which breaks the chain of trust. However, he can access the second duplicate DOC3 which is present on his local workstation, by decrypting said document which is present on said station with the private key for his electronic signature. In the case of necessity (loss or destruction of the key copy SYM1, disappearance of the user, rogatory commission, etc. . . . ), an authority certified to this effect can recover the encrypted key SYM2 from the escrow third party, recover the public key for the electronic signature of the user from the escrow for the electronic signature of said user, decrypt SYM2 with said public key and thus gain access to the plain text documents DOC1 and DOC2.

In this procedure, the user may in fact duplicate, on his information system, without risk of compromising the secrets, if said system is protected according to the rules of the art in this regard, the entirety of his CCC, managed on a remote site by his PSD. A complete integration of the secure electronic correspondence system with the other data processing applications of the business can thus be achieved.

The system of the invention can be implemented by providing commercially available servers, whose performance characteristics must be dimensioned according to the flows to be processed by the system. This is also the case for on-line storage and off-line archiving devices. Redundancies need to be provided allowing the obligations for quality of service included in the agreements with the users to be fulfilled. The data processing centres accommodating these servers and storage devices must be equipped with security devices and procedures complying with the rules of the art which allow their integrity against physical or cyber attacks to be guaranteed.

The physical architecture of the communications network connecting the various servers and storage devices must meet the same standards, but can be designed, deployed and operated by those skilled in the art. It must be defined to optimize the flow and the storage of data, which can lead to having several servers for each level of the functional architecture described in the comments to FIG. 1. The logical architecture of the network connecting the servers hosting the Directories, the servers of the PSDs, the OPETs and the PSC-CORs must however, for a preferred implementation of the system of the invention, comply with a specification, which has been mentioned several times and which is detailed in the following paragraphs.

The communications protocol implemented in the system of the invention is, in the main, prescribed by a specification established by one or more PSC-CORs. The main elements of a specification according to the prescriptions of the present invention comprise the following characteristics:

- Each server hosting a Directory, the functions of a PSD operator, certain functions of an OPET and the functions of a PSC-COR has a communications module having a unique identifier attached to its IP address, where required completed by a password controlling the entries and the exits;
- The links between the servers are established by the MCIS designating the authorized bijective relationships, and where appropriate specifying the uniterm or bijective transmissions;
- The PSC-COR must be able to receive a signed acknowledgement of receipt for all secured communications that it establishes with all the servers hosting Directories, PSD functions and OPET functions; for this purpose, each communication is subject to an electronic signature using a bi-symmetrical key and requiring from the counterparts in the communication an AR or ACK (acknowledgement); the AR may be subject to a more detailed confirmation proving that the file has been opened, verified in terms of integrity, and checked in terms of compliance (verification in the structured file carried that the mandatory statements really exist upon arrival);
- As long as the confirmation of receipt has not been received, the sender of the file is prohibited from destroying it.

Furthermore, in the communications network provided for implementing the system of the invention, sub-networks are defined which determine the procedures for the routing of the correspondences, of the tokens and of the validation tables between the various servers involved in the secure electronic correspondence operations and the procedures for validation of said routing in the sessions opened for performing a submission, a dispatch or a reception of secure electronic correspondence. The appropriate sub-network is defined for each correspondence session. In one preferred embodiment of the invention, 4 sub-networks are defined which are denoted $R_1$ to $R_4$:

$R_1$: the sender and all the addressees are attached to the same PSD operator, use the same OPET and the same PSC-COR;

$R_2$: there are at least two different PSDs that have to be involved in the secure electronic correspondence operation; the OPETs and the PSC-COR are common;

$R_3$: there are at least two different PSDs that have to be involved in the secure electronic correspondence operation; there are at least two OPETs; the PSC-COR is common;

$R_4$: there are at least two different PSDs that have to be involved in the secure electronic correspondence operation; there are at least two OPETs; there are at least two PSC-CORs.

In the sub-network $R_1$, a single server hosting a Directory disposes of all the information relating to the parties to the secure electronic correspondence operation. In the sub-networks $R_2$ and $R_3$, at least two servers hosting Directories are needed to dispose of this information, these servers hosting Directories being interrogated by the common PSC-COR. In the case of the sub-network $R_4$, a protocol for centralization of the servers hosting Directories must have been defined between the PSC-CORs concerned. One of the procedures is to provide a "super" PSC-COR having this capability for several countries.

The examples described hereinabove are presented by way of illustration of embodiments of the invention. They do not in any way limit the scope of the invention which is defined by the claims that follow.

The invention claimed is:

1. A system for secure electronic correspondence between at least one sender user and at least one addressee user, said system comprising:
   at least one electronic correspondence domiciliation server;
   at least one composition server for said correspondence; and
   at least one certification server for certification of electronic correspondence;
   wherein said composition server generates, for each correspondence operation with probative value, at least two specimens, the at least two specimens comprising identical content in different files, and at least two originals, the at least two originals comprising identical content in different files, certified as having probative value by said certification server;
   wherein one of the at least two specimens is processed to be sent to the addressee user of the correspondence operation after said correspondence operation has been validated by the sender user based on display of the other of the at least two specimens to the sender user on said electronic correspondence domiciliation server; and
   wherein one of the at least two originals is archived by an archiving server in an electronic safe of the at least one sender user and another one of the at least two originals is archived by the archiving server in an electronic safe of the at least one addressee user.

2. The system for secure electronic correspondence according to claim 1, wherein proof of validation of said correspondence operation carried out by the sender user is date stamped and linked to the specimen having served as a basis for the validation and for proof of authentication of the sender user by the electronic correspondence domiciliation server within a legal signature structured file.

3. The system for secure electronic correspondence according to claim 2, wherein a copy of said legal signature structured file is sealed by the electronic correspondence domiciliation server and archived by the archiving server.

4. The system for secure electronic correspondence according to claim 3, wherein the legal signature structured file, proof of sealing of the legal signature structured file, and proof of archiving of the legal signature structured file are recorded and deposited by the electronic correspondence domiciliation server on a third party escrow server.

5. The system for secure electronic correspondence according to claim 1, wherein, between the generation of said one of the at least two originals and the archiving of said one of the at least two originals, two copies of a symmetrical encryption key, SYM1 and SYM2, are generated by the electronic correspondence domiciliation server, said one of the at least two originals being encrypted with the copy of symmetrical key SYM1, said copy of symmetrical key SYM1 being kept in a private management office of the user, the copy of symmetrical key SYM2 being transmitted to a third party escrow after encryption of said copy of symmetrical key SYM2 by a public key of the third party escrow.

6. The system for secure electronic correspondence according to claim 1, wherein, between the generation of said one of the at least two originals and the archiving of said one of the at least two originals, two copies of a symmetrical encryption key, SYM1 and SYM2, are generated by the electronic correspondence domiciliation server, said one of the at least two originals being encrypted with the copy of symmetrical key SYM1, said copy of symmetrical key SYM1 being conserved in a management private office of the user, the copy of symmetrical key SYM2 being transmitted to said user after encryption of said copy of symmetrical key SYM2 by a public key of said user.

7. The system for secure electronic correspondence according to claim 6, wherein a copy of said copy of symmetrical key SYM2, that is encrypted by the public key of the user, is transmitted to an archiving operator to be kept with the one of the at least two originals in the electronic safe of the user.

8. The system for secure electronic correspondence according to claim 1, wherein the composition server further generates at least two duplicates, the at least two duplicates comprising identical content in different files, one of at least two duplicates to be transferred into a correspondence account of the sender user having a correspondence book located by a switching server and the other of the at least two duplicates to be transferred into a correspondence account of an addressee user having a correspondence book located by the switching server.

9. The system for secure electronic correspondence according to claim 5,
   wherein the composition server further generates at least two duplicates, the at least two duplicates comprising identical content in different files, one of at least two duplicates to be transferred into a correspondence account of the sender user having a correspondence book located by a switching server and the other of the at least two duplicates to be transferred into a correspondence account of an addressee user having a correspondence book located by the switching server; and
   wherein at least one of the at least two duplicates is encrypted with the copy of symmetrical key SYM1 prior to transfer into the correspondence book.

10. The system for secure electronic correspondence according to claim 5,
    wherein the composition server further generates at least two duplicates, the at least two duplicates comprising identical content in different files, one of at least two duplicates to be transferred into a correspondence account of the sender user having a correspondence book located by a switching server and the other of the at least two duplicates to be transferred into a correspondence account of an addressee user having a correspondence book located by the switching server; and wherein at least a third duplicate is generated, the third duplicate comprising identical content as the at least two duplicates in a different file, said third duplicate being encrypted with a public key of the sender user or the addressee user prior to transfer to a local workstation of said sender user or the addressee user.

11. The system for secure electronic correspondence according to claim 1, wherein said composition server further generates a data file to be transferred to a transmission server.

12. The system for secure electronic correspondence according to claim 1, wherein said composition server further generates a structured management file to be transmitted to an application management server of the addressee user.

13. The system for secure electronic correspondence according to claim 12, wherein transmission of the structured management file to the application management server of the addressee user is carried out according to a protocol of the AS2 type.

14. The system for secure electronic correspondence according to claim 1, wherein said composition server further generates a printing file to be transmitted to at least one electronic publishing server.

15. The system for secure electronic correspondence according to claim 1, wherein said composition server further generates at least one management coupon to become a new electronic correspondence whose content is at least partially determined by management rules for a series of electronic correspondence to which said management coupon is attached.

16. The system for secure electronic correspondence according to claim 15, wherein composition of said new electronic correspondence produced from said management coupon by the composition server attached to the certification server having certified an authentication copy of said management coupon occurs when said new electronic correspondence conforms to said management rules.

17. The system for secure electronic correspondence according to claim 1, wherein, for each correspondence operation whose probative value must be evaluated, the composition sever receives, from the electronic correspondence domiciliation server, a number of certification tokens determined by the type of said correspondence operation, said certification tokens being transmitted to the composition server by the certification server.

18. The system for secure electronic correspondence according to claim 17, wherein the certification server delivers a probative value certificate to the sender user when the certification server has received, from the electronic correspondence domiciliation server, before expiration of a settable time period, all of the certification tokens that the certification server has transmitted, return of said all of the certification tokens being proof of correct execution by said composition server of operations specified by the certification server for the type of the correspondence operation whose probative value must be evaluated.

19. A method for secure electronic correspondence between at least one sender user and at least one addressee user, said method comprising:
- connecting to a domiciliation server for electronic correspondences;
- composing said correspondence; and
- connecting the domiciliation server to a certification server for certification of the electronic correspondences,
- wherein said composition step generates, for each correspondence operation with probative value, at least two specimens, the at least two specimens comprising identical content in different files, and at least two originals, the at least two originals comprising identical content in different files, certified as having probative value by said certification server;
- wherein one of the at least two specimens is processed to be sent to the addressee user of the correspondence operation after said correspondence operation has been validated by the sender user based on display of the other of the at least two specimens to the sender user on said domiciliation server; and
- wherein one of the at least two originals is archived by an archiving server in an electronic safe of the at least one sender user and another one of the at least two originals is archived by the archiving server in an electronic safe of the at least one addressee user.

* * * * *